US008671133B2

(12) United States Patent
Krikorian et al.

(10) Patent No.: US 8,671,133 B2
(45) Date of Patent: Mar. 11, 2014

(54) SYSTEM HAVING AN ENERGY EFFICIENT NETWORK INFRASTRUCTURE FOR COMMUNICATION BETWEEN DISTRIBUTED PROCESSING NODES

(75) Inventors: Haig F. Krikorian, Fullerton, CA (US); Robert W. Loewer, Placentia, CA (US); Susan E. Smalley, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 1828 days.

(21) Appl. No.: 11/288,804

(22) Filed: Nov. 29, 2005

(65) Prior Publication Data
US 2007/0121631 A1  May 31, 2007

(51) Int. Cl.
G06F 15/16  (2006.01)
(52) U.S. Cl.
USPC ........................................................ 709/201
(58) Field of Classification Search
USPC ........................................................ 709/201
See application file for complete search history.

(56) References Cited

U.S. PATENT DOCUMENTS

2003/0093499 A1\* 5/2003 Messinger et al. ............ 709/219
2004/0156346 A1\* 8/2004 O'Neill ........................ 370/338

FOREIGN PATENT DOCUMENTS

WO  WO2004025466 A2  3/2004

OTHER PUBLICATIONS

Durresi, et al., "Delay-Energy Aware Routing Protocol for Sensor and Actor Networks", IEEE, Jul. 20, 2005, 11th Intl Conf on Parallel and Distribution Systems, 7 pgs.
European Search Report for Application No. EP 06077069, dated Mar. 16, 2007, 11 pages.
Krishnamachari, et al., "Modelling Data-Centric Routing in Wireless Sensor Networks", IEEE INFOCOM, Apr. 2002, 11 pgs.
Zheng, et al., "On-Demand Power Management for Ad Hoc Networks", INFOCOM 2003, 22nd Annual Jt Conf of IEEE Computer and Communications Societies, 11 pgs.

\* cited by examiner

Primary Examiner — Maceeh Anwari

(57) ABSTRACT

Methods, systems, and articles of manufacture consistent with the present invention provide for a data processing system having an efficient network communication infrastructure. The data processing system has a plurality of data processing nodes distributed across a network. Each node comprises a processor and a memory having an application and a routing thread operatively configured to receive a message on the network. The message has an application identifier and a message group identifier. Each application has a command thread and a plurality of message group handlers. Each routing thread is operatively configured to determine whether the received message is for the application on the respective node and to notify the application's command thread of the received message in response to determining that the message is for the application. The command thread then directs the message to one of the message group handlers based on the received message's message group identifier.

17 Claims, 19 Drawing Sheets

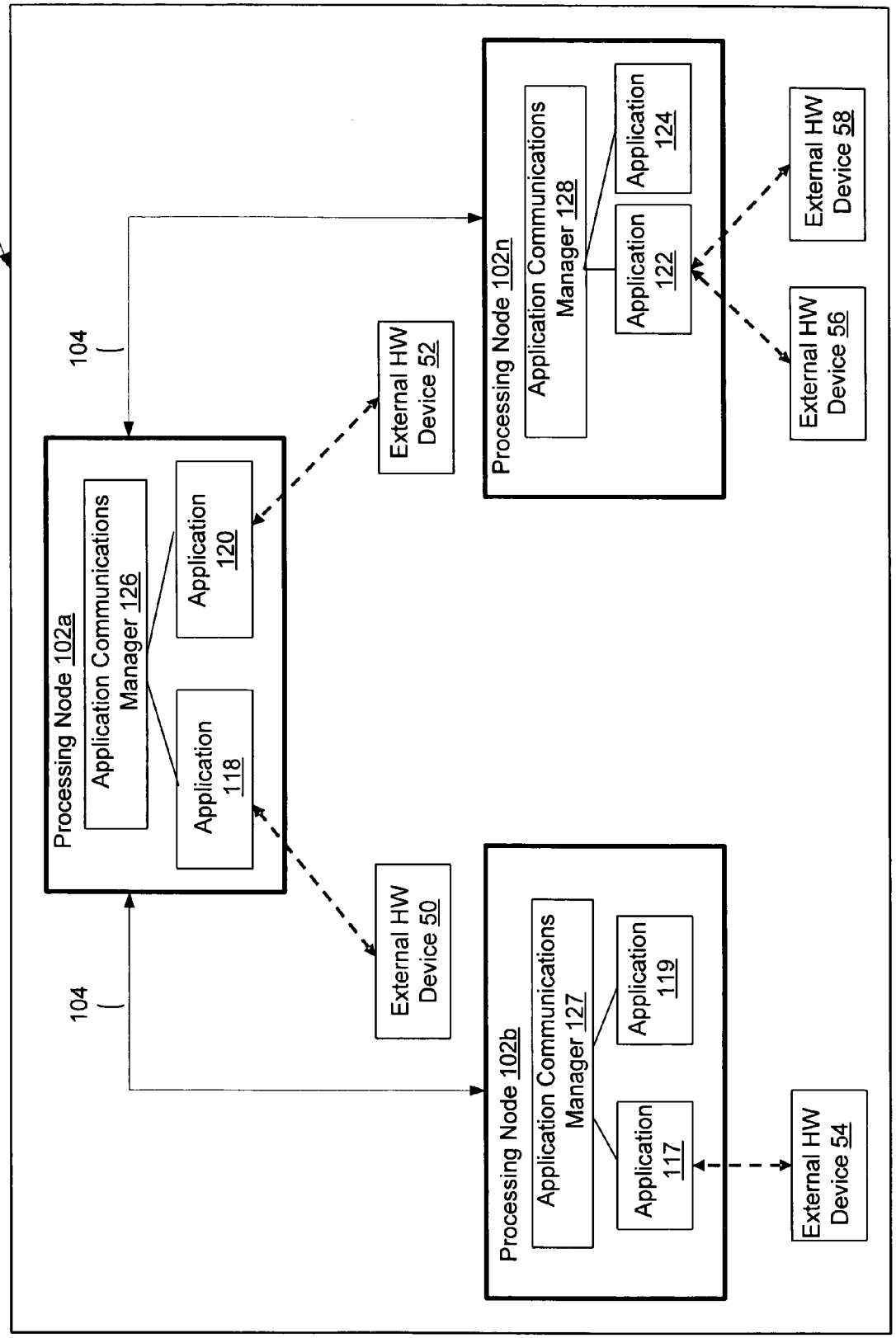

FIG. 6

```xml
<ci name="ciName">
  <messages>
    <required>
      <command name="sovol_msg_alive">Alive</command>   ← 611
      <command name="sovol_msg_echo">Echo</command>
    </required>
    <include_c>
      <header file="example_c_defs.h"/> ...</include_h>
  </messages>
  <main>
    <include_c>
      <header file="callback_c_defs.h"/> ...</include_h>
    <define name="NUM_MESSAGES" value="5">description</define>
    <callback callbackID="CI_CALLBACK_INIT_STATIC" callbackFunc="ciName_cbciInitStatic">   ← 613
      <body>
        /*put callback code here*/
      </body>
    </callback>
    <callback callbackID="CI_CALLBACK_LOCALCOMMS_UP"
              callbackFunc="ciName_cbciLocalCommsUp">   ← 615
      <body>
        /*put callback code here*/
      </body>
    </callback>
  </main>                                                ← 616
  <thread name="cmd">
    <include_c>
      <header file="commandThread_c_defs.h"/> ...</include_h>
    <define name="SOME_CONST" value="1">description</define>
    <define name="MY_EVENT" value="EVENT_UNUSED_01">
      define MY_EVENT to be the first unused event
    </define>                                            ← 619
    <event eventID="EVENT_CI_MSG_AVAILABLE"              ← 620
           eventFunc="ciName_cithrdRHevent21RxScsMsgAvail">
      <body>
        /*put event handler code here*/
      </body>
    </event>
    <event eventID="MY_EVENT" eventFunc="ciName_MY_EVENT_handler">   ← 626
      <body>
        /*put event handler code here*/
      </body>
    </event>
  </thread>
</ci>
```

602 — `<ci name="ciName">`
604 — messages section (610)
606 — main section (612, 614)
608 — thread section (618, 622, 624, 628)
600

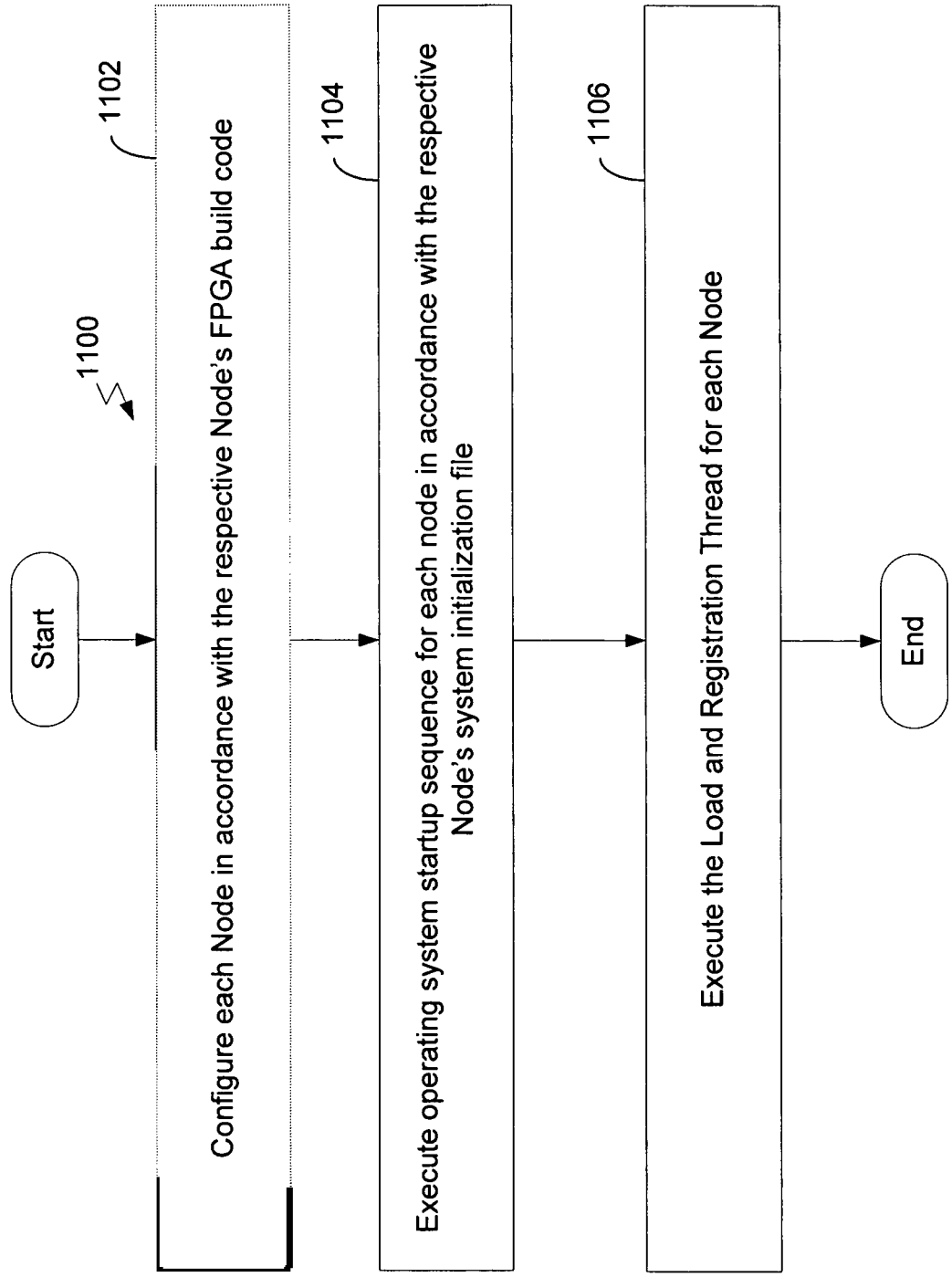

```
[AUTO LOAD]
app_count = 4 ; number of application to be loaded

#1st application
[AL_APP_1]
file = xxx.yyy " ; Test Harness Server module
entry = th_task ; entry point
spawn_task = 0 ; just call entry     ← 1202

#4th application
[AL_APP_4]
file = "/cf0/modules/ext_event_start.out"
entry = ext_event_start ;
spawn_task = 0;

#parameters for ext_event_start.out  module
[EXT_EVENT_START]
enable = 1 ; 1 => start automatically; 0 => don't fire it
interrupt_disabled  = 1 ; 1 => disable interrupts if   ext_event  is initialized settubg  fir clock modules
[CLOCK SRC]
card_count = 2;
card_1 = 1
card_2 = 2
addr = XXXXXXX ; addr = YYYYYY
data = 256 ; data = 0x100

[PPP INIT]
#set_count = x ;
#set_1_ci_id = a_cid ;
#set_1_port = a_port ; translate to / tyCo/a_port
#...
#set_x_ci_id = x_cid ;
#set_x_port = x_port ;
set_count = 2 ; 2 ports
set_1_ci_id = 11 ;     ci 11
set_1_port = 3 ;   /tyCo/3
set_2_ci_id = 12 ;    ci 12
set_2_port = 2 ; /tyCo/2
```

FIG. 14

```
# architecture configuration file                                    1400
#        define ci application load order
CFG_LOAD                                                     1414
"XXX.out"      120585      0xc36b29fd2332a26d9dcbad63beb8a788 0x00000000
"YYY..out"     121033      0xa4d8f39d0a68353aae2e3bc5f7a4b81e 0x00000000
"ZZZ..out"     123507      0x3a8693cd0e13d0430dbc7b9d379a39a4 0x00000000
..
#        define application registration order and assign application number
REGISTER
ZZZ YYY XXX
 4   5   6
#        define application run order
RUN
YYY ZZZ XXX
##################################################################
#        define autonomously executed startup commands
EXEC_LOADS
"commands.cld"      156      0x14a6c966947f90df56b2133187be1fd0 0x00000000

END
```

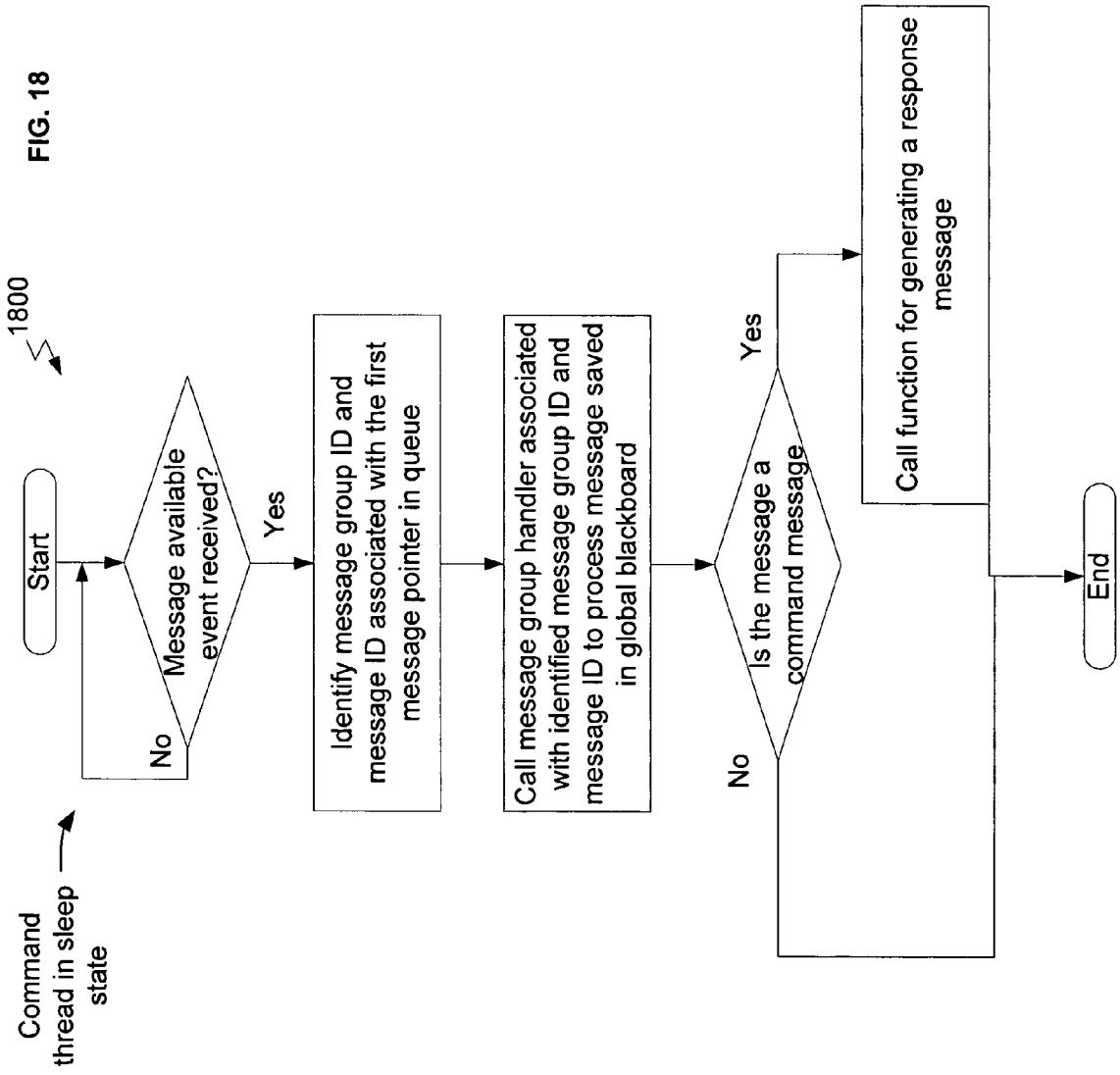

SYSTEM HAVING AN ENERGY EFFICIENT NETWORK INFRASTRUCTURE FOR COMMUNICATION BETWEEN DISTRIBUTED PROCESSING NODES

The invention was made with U.S. Government support. The U.S. Government has certain rights in this invention.

BACKGROUND OF THE INVENTION

The present invention relates to communication networks, and, more particularly, to systems and methods for implementing an energy efficient network infrastructure for communication between distributed processing nodes.

A conventional data processing system often includes multiple distributed processing nodes, where each node runs one or more task specific application programs ("task applications"). A conventional processing node typically corresponds to one of multiple processes or processors within a computer system, one of multiple single board computers within a computer system, or one of a multiple computer systems within the conventional data processing system. Task applications running on processing nodes distributed across a conventional network (e.g., computer internal bus, local or wide area network, or Internet) typically communicate with each other using common middleware software, such as Common Object Request Broker Architecture (CORBA) network programming software, that typically requires a significant amount of memory (e.g., 500k-2M bytes or more) and utilizes a significant amount of processor capacity (e.g., 25% or more CPU utilization) and throughput to process message and data communication between the task applications, resulting in substantial power consumption for the respective processing nodes. This problem is of particular concern to data processing nodes that run on batteries or other limited power sources, such as a laptop computer, aircraft avionic computer system, or computer system in a lunar rover or other space vehicle.

In addition, the network infrastructure in a conventional data processing system typically requires one data processing node to coordinate message communication between other distributed data processing nodes or task applications running on those nodes in accordance with scheduled events, resulting in unnecessary polling of messages for data from a respective task application when the data has not changed. Accordingly, the unnecessary polling of task application messages causes processor power for the respective processing node to be consumed or wasted. For example, one conventional data processing system implemented using a standard network infrastructure that exhibits this problem includes a ground based telemetry station having a central processing node operatively configured to communicate and control communication across a wireless network with a sensor task application running on a remote processing node such as a lunar rover. The sensor task application is typically polled by the central processing node of the ground based telemetry regardless of whether the sensor task application has new data, resulting in unnecessary processor power consumption by the remote processing node.

Therefore, a need exists for systems and methods that overcome the problems noted above and others previously experienced for implementing a network infrastructure for communication between distributed processing nodes.

SUMMARY OF THE INVENTION

Methods, systems, and articles of manufacture consistent with the present invention provide for a data processing system having an efficient network communication infrastructure.

In accordance with systems consistent with the present invention, a data processing system is provided having a plurality of data processing nodes distributed across a network. Each data processing node comprises a memory having an application and a routing thread operatively configured to receive a message on the network. The message has an application identifier and a message group identifier. The application has a command thread and a plurality of message group handlers. The routing thread is operatively configured to determine whether the received message is for the application based on the application identifier of the received message and to notify the command thread of the received message in response to determining that the received message is for the application. The command thread is operatively configured to direct the received message to one of the plurality of message group handlers based on the message group identifier of the received message and in response to the notification from the routing thread. Each data processing node further comprises a processor to run the application and the routing thread.

In accordance with methods consistent with the present invention, a method in a data processing system is provided for providing a network communication infrastructure between a plurality of applications distributed across a plurality of processing nodes connected by a network. The method comprises identifying a list of each of the applications to load in an architecture configuration file associated with a first of the processing nodes and loading each of the applications identified in the list into a memory of the first node. Each of the applications identified in the list has a command thread. The method also comprises assigning a respective application identifier to each of the applications in the list, storing each assigned application identifier in a routing table, and receiving, via the first node, a message on the network. The message has a destination application identifier and a message group identifier. The method further comprises determining whether the destination application identifier corresponds to one of the assigned application identifiers in the routing table, and, when it is determined that the destination application identifier corresponds to one of the assigned application identifiers in the routing table, notifying the command thread of the application corresponding to the destination application identifier that the received message is available for access.

In accordance with articles of manufacture consistent with the present invention, a computer-readable medium containing instructions for controlling a data processing system to perform a method is provided. The data processing system has a plurality of data processing nodes distributed across a network and a plurality of applications. The method comprises identifying a list of each of the applications to load in an architecture configuration file associated with a first of the processing nodes and loading each of the applications identified in the list into a memory of the first node. Each of the applications identified in the list has a command thread. The method also comprises assigning a respective application identifier to each of the applications in the list, storing each assigned application identifier in a routing table, and receiving, via the first node, a message on the network. The message has a destination application identifier and a message group identifier. The method further comprises determining whether the destination application identifier corresponds to one of the assigned application identifiers in the routing table, and, when it is determined that the destination application identifier corresponds to one of the assigned application identifiers in the routing table, notifying the command thread of the application corresponding to the destination application identifier that the received message is available for access.

In accordance with systems consistent with the present invention, a data processing system is provided having a plurality of data processing nodes distributed across a network and a plurality of applications. Each data processing node comprises: a memory; a secondary storage having an architecture configuration file; means for identifying in the architecture configuration file a list of each of the applications to load in the memory of the respective node; and means for loading each of the applications identified in the list into the memory of the respective node. Each of the applications identified in the list has a command thread. Each data processing node also comprises: means for assigning a respective application identifier to each of the applications in the list; means for storing each assigned application identifier in a routing table; and means for receiving a message on the network. The message has a destination application identifier and a message group identifier. Each data processing node further comprises means for determining whether the destination application identifier corresponds to one of the assigned application identifiers in the routing table; and means for, when it is determined that the destination application identifier corresponds to one of the assigned application identifiers in the routing table, notifying the command thread of the application corresponding to the destination application identifier that the received message is available for access.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 1A is a block diagram of an exemplary data processing system having a plurality of data processing nodes distributed across a network; each data processing node having one or more applications and application communications manager operatively configured to provide an energy efficient network infrastructure for communication between the applications on the distributed processing nodes in accordance with the present invention;

FIG. 6 depicts the structure of an exemplary application definition file used to generate the source code for one or more of the applications in accordance with the present invention;

FIG. 11 is a flow diagram illustrating steps in a method for initializing the data processing system to generate an efficient network communication infrastructure consistent with the present invention;

FIG. 12 depicts an exemplary system initialization file executed by each processing node's operating system in accordance with the method for initializing the data processing system;

FIG. 14 depicts an exemplary architecture configuration file accessed by the load and registration service thread to load, register, and initiate execution of the one or more applications in accordance with the present invention;

FIG. 18 is a flow diagram illustrating a process performed by each command thread in response to receiving a message available event indication from the routing thread residing on the same node as the command thread.

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

I. System Architecture

Figure 1B:
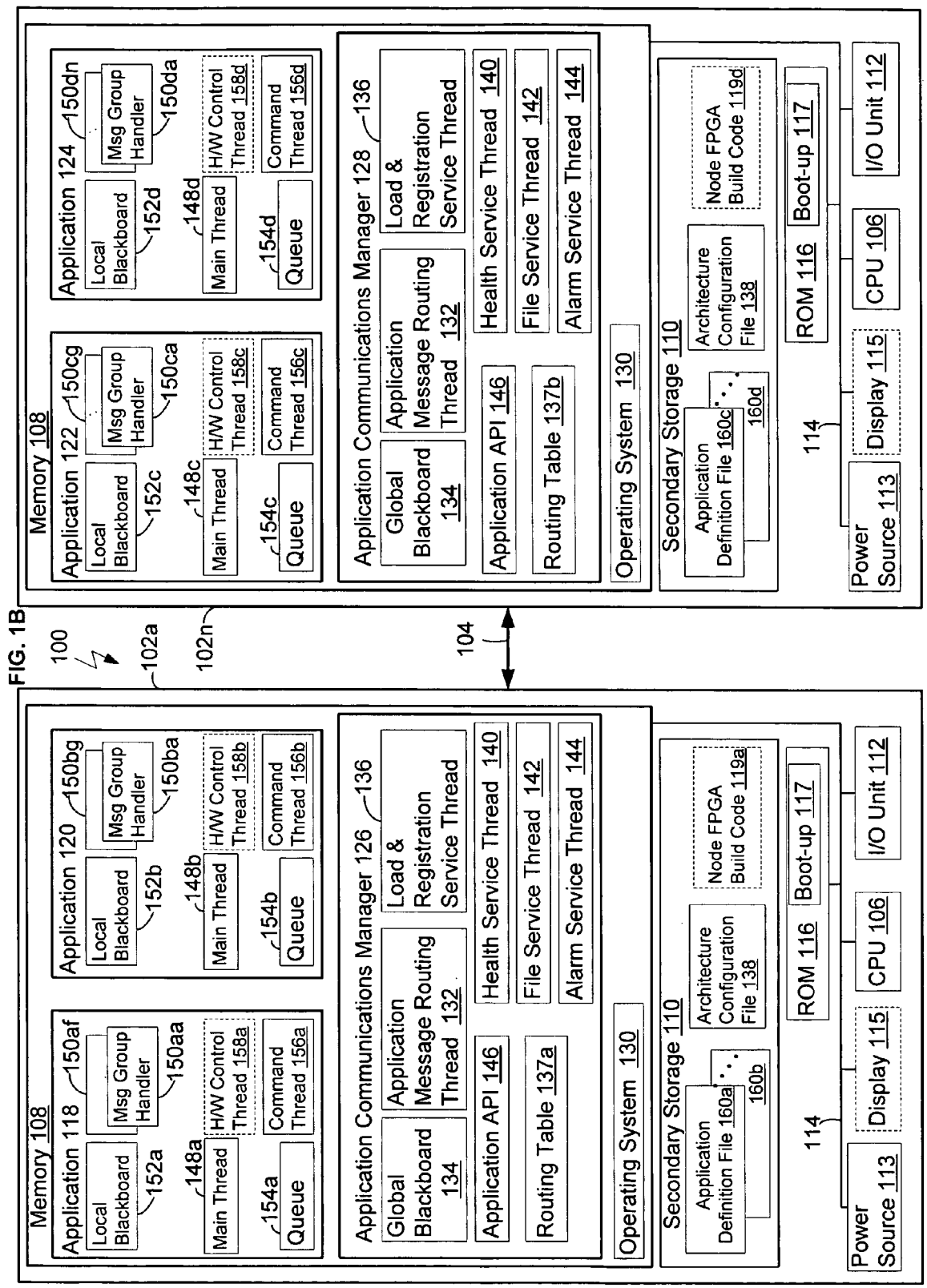
FIG. 1B is a detailed block diagram of the data processing system in FIG. 1A.

FIG. 1A depicts an exemplary block diagram of a data processing system 100 configured to have an energy efficient network infrastructure consistent with the present invention. FIG. 1B is a detailed block diagram of the data processing system 100. The data processing system 100 has a plurality of data processing nodes 102a, 102b (not shown in FIG. 1B for clarity), and 102n distributed across a network 104. As shown in FIG. 1A, the data processing nodes 102a, 102b, and 102n may be arranged in a star type configuration in which one 102a of the nodes is the master or central node of the network. However, the data processing nodes 102a, 102b, and 102n may be arranged in a daisy-chain or other network configuration.

In one implementation, each data processing node 102a and 102n may be a user-defined processor device implemented using a very high density field programmable array (FPGA), application specific integrated circuit (ASIC) device, or other programmable logic chip or circuit design platform. Alternatively, each data processing node 102a and 102n may be a single board computer or any general-purpose computer system such as an IBM compatible, Apple, or other equivalent computer. The network 104 may be any known serial bus (e.g., UART serial bus), multiplex bus, local bus (e.g., Industry Standard Architecture (ISA) bus, Micro Channel Architecture (MCA) bus or Enhanced ISA (EISA) bus), or private or public communication network, such as a local area network ("LAN"), WAN, Peer-to-Peer, or the Internet. The network 104 may include hardwired, as well as wireless branches. In one implementation, the network 104 may be a logical bus operatively configured in memory, such as memory 108 on processing node 102a.

As shown in FIG. 1B, each data processing node 102a and 102n comprises a central processing unit (CPU) 106 capable of processing multi-threaded programs (e.g., applications 118, 120, 122, and 124). As known to one having ordinary skill in the art, a thread is an encapsulation of the flow of control in a program. One having ordinary skill in the art will appreciate that a single-threaded program has one path through its code that may be executed by the CPU 106 at a time while a multi-threaded program may have several threads running through different code paths that may be separately and substantially simultaneously executed by the CPU such that the time required to switch threads and the state needed to be saved and restored when changing threads is minimized.

Each data processing node 102a and 102n also includes a memory 108, a secondary storage device 110 an input/output (I/O) unit 112, and a power source 113, such as a battery, each of which is operatively connected to the CPU 106 via a local bus or backplane 114. The secondary storage may be a non-volatile RAM, a fixed or removable hard disk, a read/write CD, or any other non-volatile memory device. The I/O unit 112 may comprise discrete external hardware components (e.g., D/A converters, address/data transceivers, receiver, transmitter, modem, bus/network drivers, or other I/O components) for interfacing with external systems or devices 50-58 in FIG. 1A, such as a thermal or radiation sensor, an antenna, actuator, altimeter, keyboard, display 115, or other device that may be controlled by an application running on the respective data processing node 102a and 102n in accordance with the present invention.

Each data processing node 102a and 102n may also include a read-only memory 116 for storing a boot-up program 117 accessed by the respective CPU 106 upon power-up in order to load and initialize an energy efficient network infrastructure for the data processing system 100 in accordance with the present invention. In one implementation in which the processing node 102a or 102n corresponds to a user-defined processor device, such as an FPGA, the boot-up program 117 may initially call a node device build code 119a or 119b to configure the internal hardware components of the processing node 102a or 102n in accordance with a circuit design (not shown in the figures) of a user or developer.

Memory 108 in each data processing node 102a and 102n stores one or more applications 118, 120, 122, and 124, an application communications manager 126 or 128, and an operating system 130. The operating system 130 may be VxWorks™, LynxOS®, Solaris™ or other operating system having a plurality of programmable events or interrupts that allow process control to be transferred to a corresponding event handler associated with a thread (e.g., command thread 156a-156d in FIG. 1B of one of the applications 118, 120, 122, and 124 when the respective event is triggered by one of the threads (e.g., application message routing thread 132) of the application communications manager 126 or 128. As discussed below, each application 118, 120, 122, and 124 has a main thread 148a, 148b, 148c, or 148d associated with a respective command thread 156a, 156b, 156c, or 156d operatively configured to be event-driven such that the command thread enters a sleep state until a corresponding event trigger causes the command thread to wake up and begin processing. Each main thread 148a, 148b, 148c, or 148d is also operatively configured to enter a sleep state unless called by a function (e.g., event handler associated with the command thread 156a, 156b, 156c, or 156d) to perform an associated process.

In general, each of the applications 118, 120, 122, and 124 is developed to perform a task that may require communication with another of the applications. For example, the data processing system 100 may correspond to an aircraft avionic data processing system, such as the space shuttle, having a sensor subsystem (e.g., a radar, thermal sensor, or cabin pressure sensor) and a central computer subsystem. In this example, the processing node 102a may be a single board computer in the sensor subsystem and the processing node 102n may be another single board computer in the central computer subsystem. Each of the applications 118, 120, 122, and 124 has a command thread 156a, 156b, 156c, or 156d to handle message communication with the application communications manager 126 or 128 and a main thread 148a, 148b, 148c, or 148d that may be developed to perform a respective task for a mission to be carried out by the aircraft system over a period of time, such as a week or month. Continuing with the example, the main thread 148a of the application 118 in the processing node 102a (e.g., the sensor subsystem) may be developed to control a radar sensor to sense for airborne targets upon command from the application 122 located across the network 104 in the data processing node 102n (e.g., the central computer subsystem). In this example, the main thread 148a of the application 118 may first provide (via the command thread 156a and the applications communications manager 126) raw sensed target data to the other application 120 (via the command thread 156b) in the same node 102a for target detection processing. The main thread 148b of the other application 120 may then submit the processed target detection data across the network in one or more messages to the requesting application 122 (via the command thread 156c and the applications communications manager 128). In accordance with infrastructure provided by the application communication managers 126 and 128, the main thread 148a and the command thread 156a of the application 118 may not be required to operate (e.g., both enter a sleep state) until triggered to "wake up" and respond to the command (e.g., to sense for airborne targets) sent from the application 122. As discussed below, in accordance with the present invention, each application communication manager 126 and 128 of each data processing node 102a and 102 is operatively configured to facilitate communication between the applications such that the power consumption of the respective processing node 102a or 102n is reduced while message and data throughput between applications 118, 120, 122, and 124 is increased.

Figure 2:
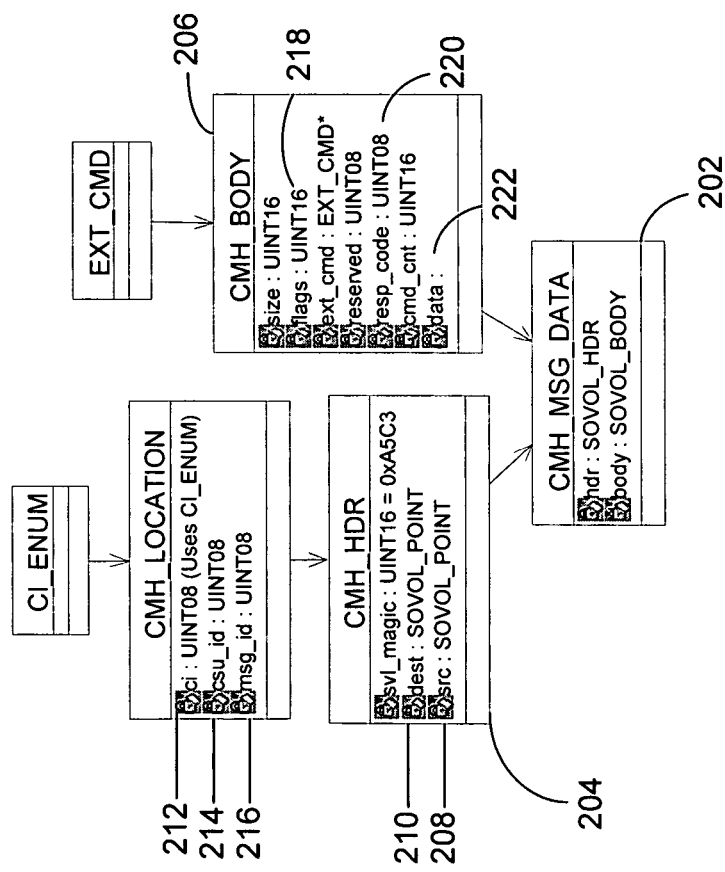
FIG. 2 depicts the structure of an exemplary message transmitted by a first application to a second application via a first routing thread of the application communications manager residing on the same node as the first application and a second routing thread of the application communication manager residing on the same node as the second application.

As shown in FIG. 1B, each application communications manager 126 and 128 includes an application message routing thread (the "routing thread") 132 that is operatively configured to manage message communication to and from each application 118, 120 or 122, 124 registered as residing on the same node 102a or 102n as the respective routing thread 132. Rather than assign each node 102a and 102n a network address, each application 118, 120, 122, and 124 is assigned an application ID during the registration process discussed below so that each routing thread 132 is able to determine whether a message transmitted on the network 104 is directed to an application 118, 120, 122, or 124 residing on the same node as the respective routing thread 132. For example, FIG. 2 depicts the exemplary structure of a message 202 that may be transmitted by a first application (e.g., 118) to a second application (e.g., 122) via the routing threads 132 residing on the same nodes 102a and 102n as the first and second applications 118 and 122. The message 202 includes a message header 204 and a message body 206. The message header 204 includes a source location 208 and a destination location 210. The source location 208 includes an application identifier ("ID") 212 assigned to the first application 118 that transmitted the message 202. The source location also includes a message group ID 214 and a function or message ID 216. The message group ID 214 identifies the message 202 as being associated with one of a plurality of functional group types, such as a command message group, a data message group, a control message group, or an application event message group. The message group ID 214 allows sorting of messages 202 transmitted between applications 118, 120, 122, and 122 and separate processing by the applications 118, 120, 122, and 122 such that the functional group types effectively correspond to virtual busses between the applications 118, 120, 122, and 122 and provide for a more efficient network communication infrastructure. The message ID 216 identifies the function or message handler that corresponds to the message 202. The destination location 210 also has an application ID 212, a message group ID 214, and a message ID 216. The routing thread 132 associated with each processing node 102a and 102n is operatively configured to detect a message 202 on the network 104 and to determine whether the message 202 is to be directed to an application 118, 120, 122, and 122 residing on the same node 102a or 102n as the respective routing thread 132. Thus, the routing threads 132 on each node 102a and 102n together enable one application (e.g., 118) to directly communicate with another application (e.g., 122) across the network 104 without a central application or node managing network 104 traffic via message polling or broadcasting a message based on an event raised by the one of the applications 118, 120, 122, and 124. As a result, message communication across the network 104 is reduced and unnecessary message construction/deconstruction associated with a message polling implementation is avoided, saving power consumption for the nodes 102a and 102n.

As shown in FIG. 2, the message body 206 may include a group of flags 218 one of which identifies the message 202 as a priority message so that the routing thread 132 on the same node 102a or 102n as the identified destination application 210 causes the identified destination application 210 to handle the message 202 before any other message identified in the application's queue 154a, 154b, 154c, or 154d.

The message body 206 may also include a response code 220 that is set when the message 202 is sent to the identified destination application 210 in response to a previous message 202 sent to the identified source application 208.

The message body 206 may also include data 222 associated with the message 202 that the identified destination application 208 needs or is being commanded to use based on the function or message ID 216.

Figure 3:
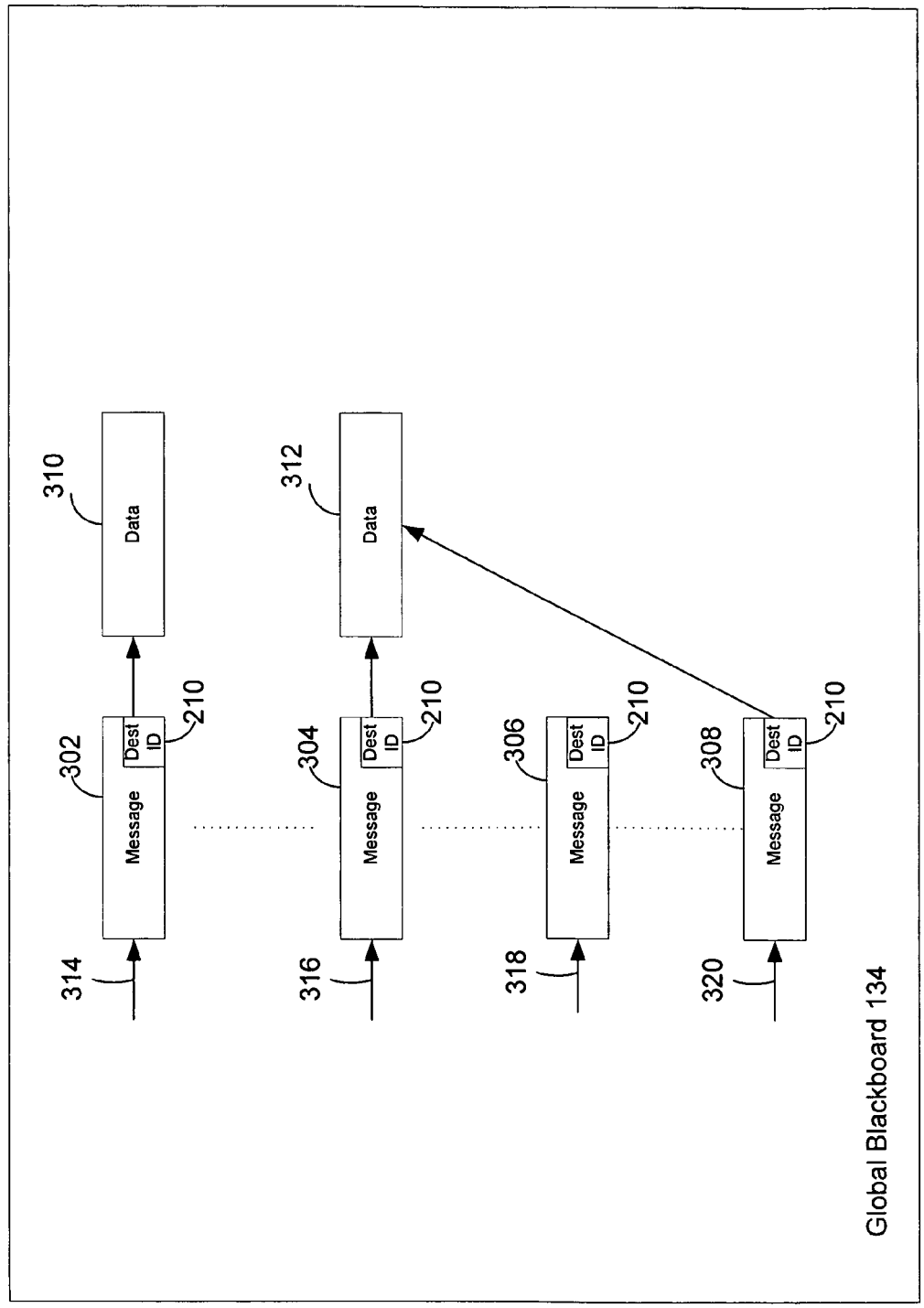
FIG. 3 depicts the structure of an exemplary global blackboard storage for each application communications manager on each processing node.

Returning to FIG. 1B, each application communications manager 126 and 128 also includes a global blackboard 134 storage that is operatively controlled by the routing thread 132 of the respective manager 126 and 128. As shown in FIG. 3, each routing thread 132 stores in the global blackboard 134 each message 302, 304, 306, and 308 transmitted or received by each application 118, 120 or 122, 124 registered as residing on the same processing node 102a or 102n as the routing thread 132 as described in further detail below. As mentioned above, each message 302, 304, 306, and 308 has an associated destination ID 210, which is used to route the message 302, 304, 306, and 308 to a message handler (e.g., 150aa, 150ba, 150ca, or 150da in FIG. 1B) associated with the identified destination application 118, 120, 122, or 124 based on the message group ID 214 and the message ID 216 identified in the destination ID 210. In one implementation, each global blackboard 134 may have the messages 302, 304, 306, and 308 arranged in different size message pool structures, such as a first pool of messages 302 and 304 where each message size is less than 64 bytes and a second pool of messages 306 and 308 where each message size is up to 2048 bytes or more in order to assist in the memory management of each global blackboard. Each global blackboard 134 may also have a separate structure or space for each message (e.g., 302) related to the health of an application 118, 120, 122, or 124 and managed by the health service thread 140 as discussed below. Each global blackboard 134 may also have a separate structure or space for each message (e.g., 306) related to an alarm from an application 118, 120, 122, or 124 and managed by the alarm service thread 144 as discussed below so that alarm data may be assembled by the global blackboard into a single area for common notification or broadcast to each application 118, 120, 122, and 124. Each global blackboard 134 is operatively configured or defined such that the global data state or condition of each thread (e.g., main thread 148a, command thread 156a, and H/W control thread 158a) in each application residing on the same node as the global blackboard 134 (e.g., application 118) so that a local blackboard (e.g., 152a) associated with a respective application (e.g., 118) is able to monitor a transition in a state or condition of data associated with a respective thread (e.g., H/W control thread 158a).

When data 310 or 312 associated with a message 302, 304, 306, or 308 is received by the respective routing thread 132, the routing thread 132 stores the data 310 or 312 in association with the received message 302, 304, or 308. The global blackboard 134 is operatively configured using object oriented programming or other known common data storage techniques such that data 312 associated with two or more messages 304 and 308 is stored once in the global blackboard 134. When the respective routing thread 132 receives a message 302, 304, 306, or 308 for an application 118, 120, 122, or 124 registered as residing on the same processing node 102, the routing thread 132 stores a pointer 314, 316, 318, or 320 to the respective message 302, 304, or 308 in a message queue 154a, 154b, 154c, or 154d associated with the application 118, 120, 122, or 124 and raises a registered event associated with the command thread 156a, 156b, 156c, or 156d to cause the associated command thread 156a, 156b, 156c, or 156d to process the received message 302, 304, 306, or 308 in accordance with the present invention.

Figure 4:
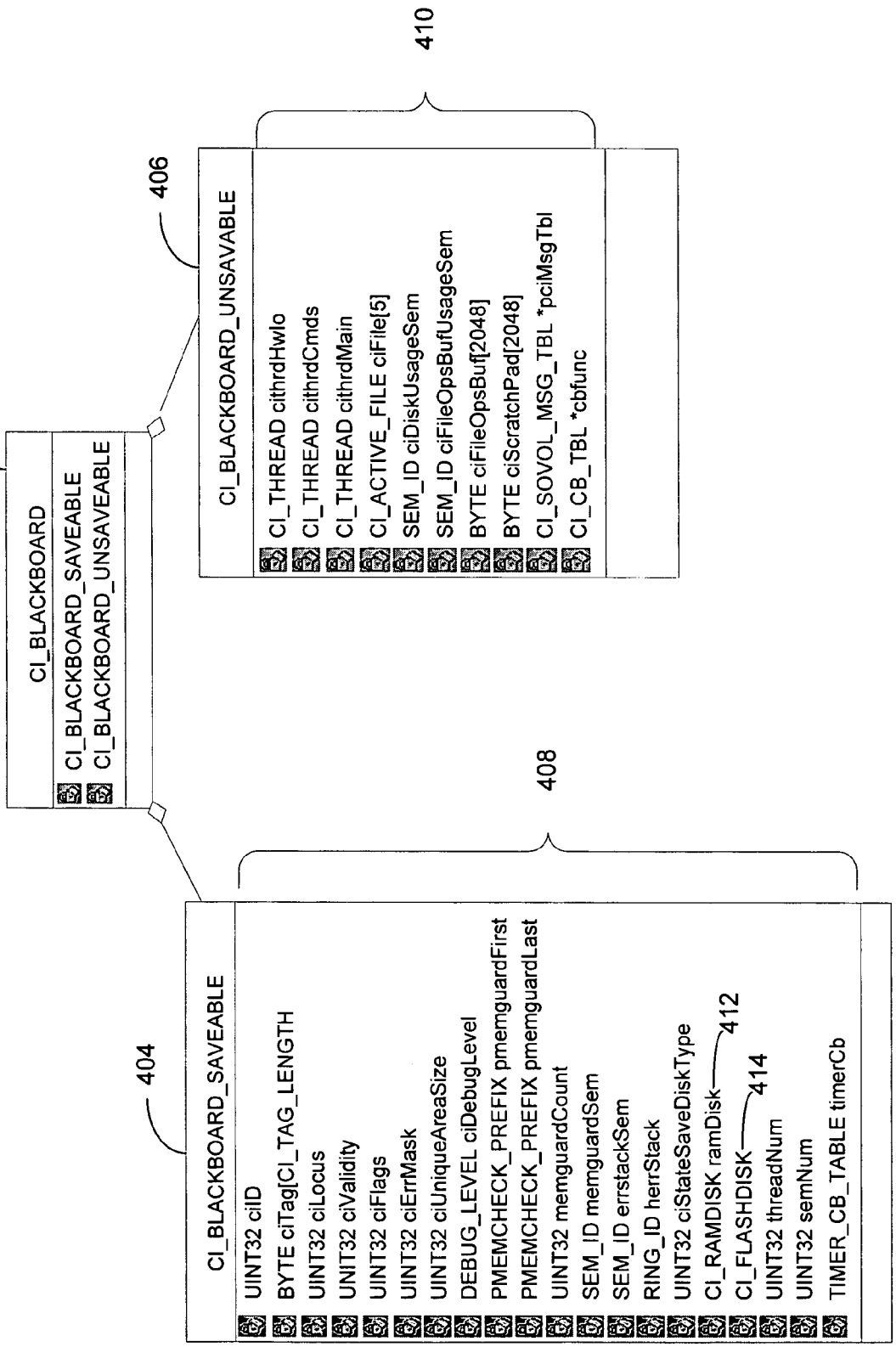
FIG. 4 depicts the structure of an exemplary local blackboard storage for each application on each processing node.

Each application 118, 120, 122, and 124 has a local blackboard 152a, 152b, 152c, or 152d that stores a state condition for message data 310 and 312 associated with the respective application 118, 120, 122, or 124 and stored in the global blackboard 134. FIG. 4 depicts the structure of an exemplary local blackboard 402 storage for each application 118, 120, 122, and 124 on each processing node 102a and 102n. As shown in FIG. 4, each local blackboard 152a, 152b, 152c, and 152d includes a saveable portion 404 and an unsaveable portion 406. The saveable portion 404 has dynamic data 408 (e.g., state of message data 310 and 312) that may change during runtime of the application 118, 120, 122, or 124 associated with the respective blackboard 152a, 152b, 152c, and 152d. The saveable portion 404 corresponds to or includes the global state of data associated with the respective application's threads (e.g., H/W control thread 158a of application 118) maintained in the global blackboard. The unsaveable portion 406 has static data 410 that is set when the associated application 118, 120, 122, or 124 is initialized during the load and registration process discussed below. Each application 118, 120, 122, or 124 may be programmed to call a save function (not shown in the figures) that saves the saveable portion 404 of the local blackboard 152a, 152b, 152c, and 152d so that the saveable portion may be later restored. By limiting application message data storage to the global blackboard 134, data storage capacity is saved and data movement between the applications 118, 120, 122, and 124 is substantially minimized, which further reduces CPU 106 processing, allowing the nodes 102a and 102n to be more power efficient.

Returning to FIG. 1B, each application communications manager 126 and 128 also includes a load and registration service thread 136 that is operatively configured to load each application 118, 120, 122, 124 from secondary storage 110 into memory 108, define the order each application 118, 120, 122, 124 is to register to the system 100, and initiate execution of the applications 118, 120, 122, and 124 in accordance with an architecture configuration file 138 as discussed in detail below. In one implementation, the load and registration thread 136 is initially called by the boot-up program 117.

Each application communication manager 126 and 128 may also include a health service thread 140, a file service thread 142, and an alarm service thread 144. The health service thread 140 is a system 100 function that may be called by one application (e.g., 118) on one node 102a to identify the health of another application (e.g., 122) on another node 102n in the data processing system 100. The health service thread 140 will return an alive status or heartbeat identifier if the other application (e.g., 122) is loaded in memory 108 and running.

The file service thread 142 comprises a plurality of file operations shown in Table I below that an application 118, 120, 122, and 124 may use to access or manipulate a file (not shown in FIG. 1B) in memory 108 or secondary storage 110. Each file operation is defined to replace corresponding operating system 130 functions in order to enforce source code and compiled code commonality between applications 118, 120, 122, and 124 in order to minimize unnecessary data movement and CPU 106 cycles associated with file access and manipulation.

TABLE I

| 1. | file open |
| 2. | file close |
| 3. | file write |
| 4. | file read |
| 5. | file verify |
| 6. | file delete |
| 7. | file rename |
| 8. | file copy |
| 9. | file append |
| 10. | file delta |

The alarm service thread 144 comprises a system 100 function that may be called by one application (e.g., 118) to signal an alarm event to another application (e.g., 122) over the network 104 without having to go through a central application to broadcast the alarm event.

Figure 5:
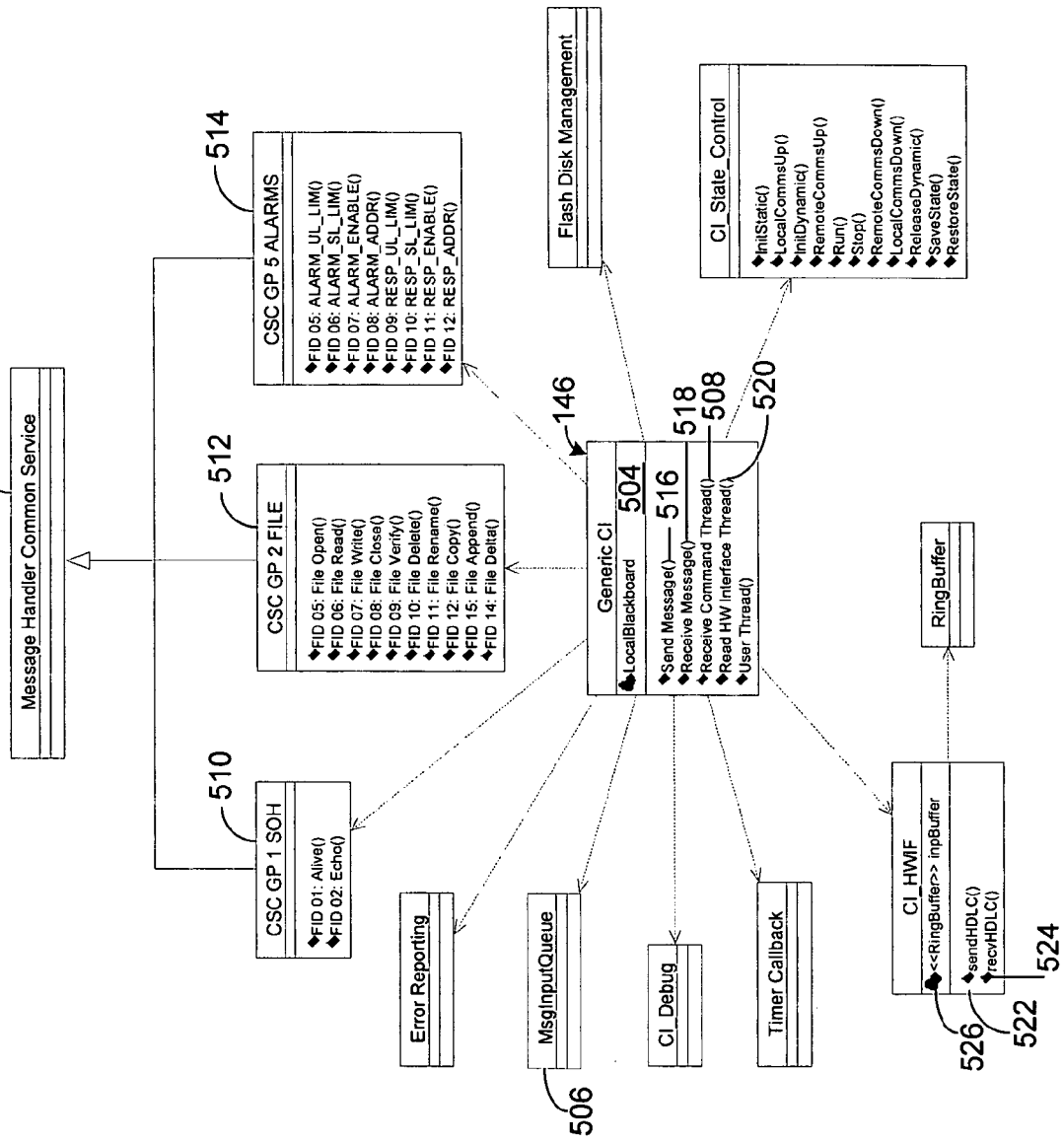
FIG. 5 depicts the structure of an exemplary application API implemented by each application on each processing node to force each application to be in compliance with the communications infrastructure provided by the application communication managers in accordance with the present invention.

Each application communication manager 126 or 128 also has a template or application API 146 that is incorporated into or instantiated in each application 118, 120, 122, and 124 to force each application to be in compliance with the communications infrastructure or architecture provided by the application communication managers 126 and 128 in accordance with the present invention. FIG. 5 depicts an exemplary structure of the application API 146 instantiated in each application 118, 120, 122, and 124. As shown in FIG. 5, the application API 146 includes a message handler type definition 502, a local blackboard 504, a message input queue ("MsgInputQueue") type definition 506, and a command thread 508 ("Receive Command Thread( )") function. The message handler type definition 502 provides an application 118, 120, 122, and 124 with a common interface (e.g., 510, 512, and 514) for handling an event raised by one or more of the service threads (e.g., 140, 142, and 144) of the application communication manager 126 or 128 for the respective application 118, 120, 122, and 124. The message input queue ("MsgInputQueue") 506 defines the storage block in which the application message routing thread 132 stores a pointer to each message received by the application message routing thread 132 for the respective application. In one implementation, the message input queue is defined to be a FIFO type buffer. Each application message routing thread 132 is operatively configured to signal that a message pointer has been stored in a queue 506 associated with an application 118, 120, 122, or 124 by raising a message available event associated with the application 118, 120, 122, or 124. The command thread 508 function identifies the structure for receiving and responding to an associated message available event from the application message routing thread 132.

The application API 146 also includes a send message function 516 that may be used by the command thread 508 to process a message for output to the application message routing thread 132 and a receive message function 518 to process a message identified by a pointer stored in the queue 506.

The application API 146 may also include a hardware control thread 520 function that includes a hardware output control function 522 for controlling discrete external hardware components of the I/O unit 112 associated with the respective application 118, 120, 122, or 124. The hardware control thread 520 may also include a hardware input function 524 for receiving data discrete external hardware components of the I/O unit 112 associated with the respective application 118, 120, 122, or 124 and storing the data in a buffer defined by the input buffer type 526.

As shown in FIG. 1B, in addition to a main thread 148a, 148b, 148c, or 148d, each application 118, 120, 122, and 124 includes a plurality of message group handlers 150aa-af, 150ba-bg, 150ca-cg, and 150da-dn, a local blackboard 152a, 152b, 152c, or 152d, a queue 154a, 154b, 154c, or 154d, and a command thread 156*a*, 156*b*, 156*c*, or 156*d*; each of which is implemented based on the Application API 146 of the application communication manager 126 and 128. Although the message group handlers 150*aa-af*, 150*ba-bg*, 150*ca-cg*, and 150*da-dn* may be tailored by a developer to support the specific application 118, 120, 122, or 124, it is contemplated that one or more of the message group handlers associated with respective applications (such as the message group handler for command messages) may be the same.

If the application 118, 120, 122, or 124 is required to interface with external devices (e.g., a sensor) via the I/O unit 112, the application 118, 120, 122, or 124 also includes a H/W control thread 158*a*, 158*b*, 158*c*, or 158*d* implemented based on the hardware control thread 520 function of the Application API 146.

In one implementation, each application 118, 120, 122, and 124 is generated from an associated application definition file 160*a*, 160*b*, 160*c*, or 160*d*, which may be described based on extensible Markup Language ("XML") or other document description language. FIG. 6 depicts the structure of an exemplary application definition file 600 that used to generate the source code for a corresponding application 118, 120, 122, or 124. As shown in FIG. 6, each application definition file 160*a*, 160*b*, 160*c*, or 160*d* includes an application identifier tag 602, a message definition section 604, a main thread definition 606, and a command thread definition 608. A developer may include other thread definitions, such as the H/W control thread 158*a*, 158*b*, 158*c*, or 158*d*, using the same format as the command thread definition 608. The application identifier tag 602 corresponds to a name or other identifier given to the application 118, 120, 122, or 124 by the application developer. The message definition section 604 identifies the messages to be supported (e.g., transmitted or received) by the respective application 118, 120, 122, or 124. In one implementation, the message definition section 604 includes a required message subsection 610 that identifies messages associated with one or more of the service threads 136, 140, 142, or 144 that each application 118, 120, 122, or 124 is required to support or process. For example, each application 118, 120, 122, or 124 may be required to support the "sovol_msg_alive" command message 611 as shown in FIG. 6 which may be invoked by the health service thread 140 to identify the health (e.g., "alive") of the application (e.g., 118) on a periodic basis or in response to a request from another node 102*n* in the data processing system 100.

Figure 7:
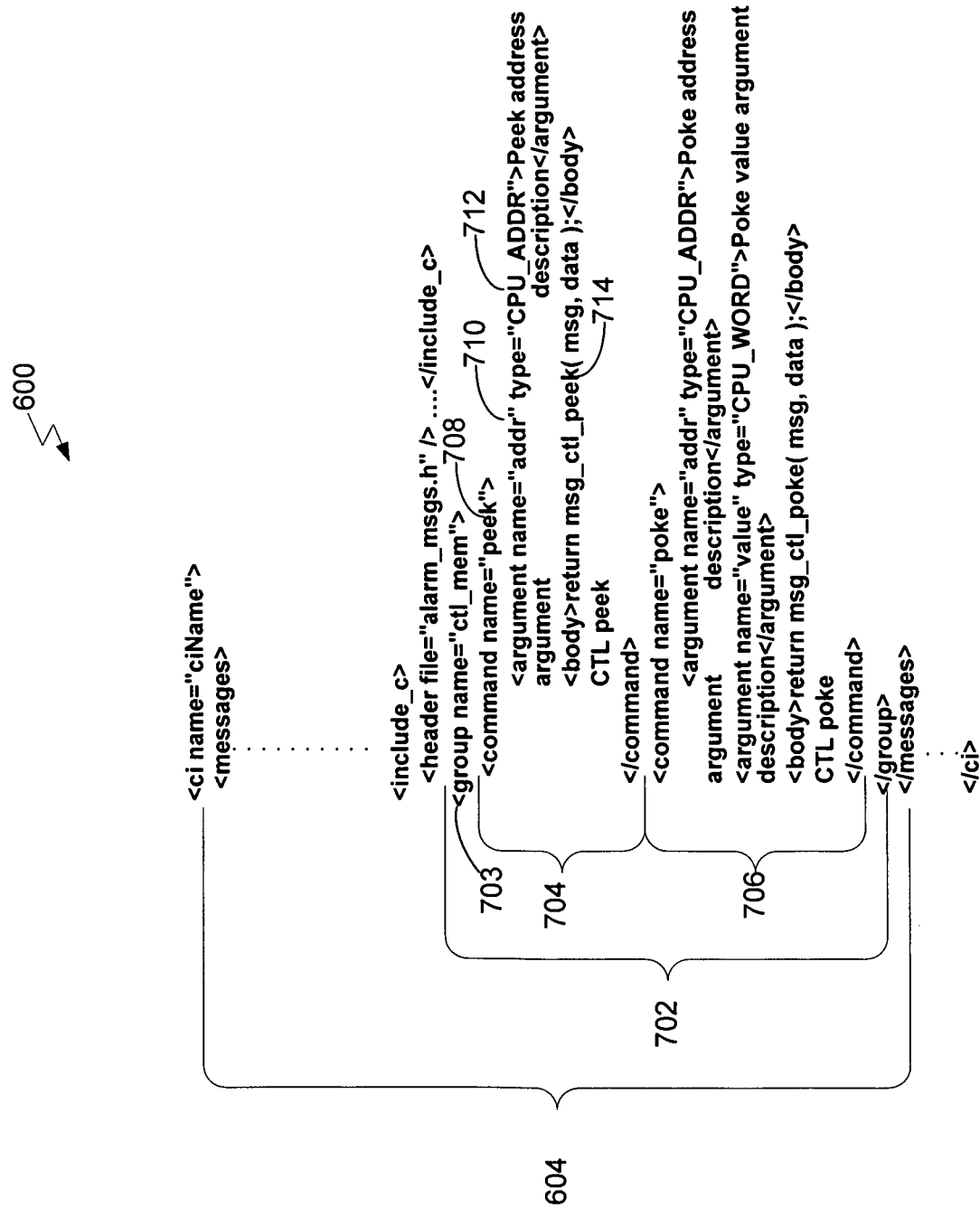
FIG. 7 depicts a section of the application definition file that defines an association between a message and a message group in accordance with the present invention.

As previously discussed, each message (e.g., message 202 in FIG. 2) transmitted between applications 118, 120, 122, and 124 is associated with a message group to facilitate routing of the message 202 for processing by the destination application identified in the message 202. FIG. 7 depicts a message group section 702 of the application definition file 600 that defines an association between a message and a message group in accordance with the present invention. As shown in FIG. 7, the message group section 702 includes a message group identifier tag 703 and one or more message definition subsections 704 and 706. The message group identifier tag 602 corresponds to a name (e.g., "ctl_mem" may reflect a control group) or other identifier given to the message group by the application developer. Each message definition subsection 704 and 706 identifies respective messages to be associated with the message group identified by the tag 602. In one implementation, each message definition subsection 704 and 706 includes a message or function name 708 or other identifier, an argument identifier 710 and associated argument type 712, and a message body 714. As discussed below, each message group section 702 is used to generate a message group table 808 in FIG. 8 that may be accessed by each of the applications 118, 120, 122, and 124 to respond to or process a message 202 in accordance with the present invention. It is contemplated that each message 202 or 708 may be associated with a message group 702 once in one application definition file (e.g., 160*a*) or in a separate message definition file (not shown in figures). The message group table 808, when built in accordance with the present invention, then allows each application to identify the message group handler for processing a received message 202.

Returning to FIG. 6, each main thread definition 606 includes one or more callback definitions 612 and 614, each of which corresponds to a function 613 or 615 performed by the thread services 136, 140, 142, or 144 or the operating system 130 and that may be invoked by the associated main thread (e.g., 148*a*, 148*b*, 148*c*, or 148*d*) during runtime. Each callback function 613 or 615 is operatively configured to allow the program control to be returned to the respective main thread.

Each command thread definition 608 includes a thread identifier tag 616 set to a name (e.g., "cmd") or other identifier to signal that the thread definition 608 is for a command thread 156*a*, 156*b*, 156*c*, or 156*d*. Other thread definitions (not shown in FIG. 6) may be provided in a format similar to the command thread definition 608 to define other threads. In this instance, the thread identifier tag 616 may be set to another name ("e.g., H/W") to identify the other thread (e.g., the H/W control thread 158*a*). Each command thread definition 608 also includes an event ID tag 618 that is set to the event name 619 (e.g., "EVENT_CI_MSG_AVAILABLE") to be registered with the routing thread 132 and binded to a corresponding operating system 130 event such that the routing thread 132 may raise the corresponding operating system 130 event to cause the command thread 156*a* of the respective application 118, 120, 122, and 124 to process a received message 202 in accordance with the present invention. The command thread definition 608 also includes an event function or handler identifier 620 and event handler code 622 to be associated with the event name 619. The identified event handler 620 corresponds to one of the message group handlers (e.g., 150*aa*, 150*ba*, 150*ca*, or 150*da*) defined for the respective application 118, 120, 122, or 124, which is called by the command thread 156*a*, 156*b*, 156*c*, or 156*d* for processing in accordance with the present invention.

Figure 8:
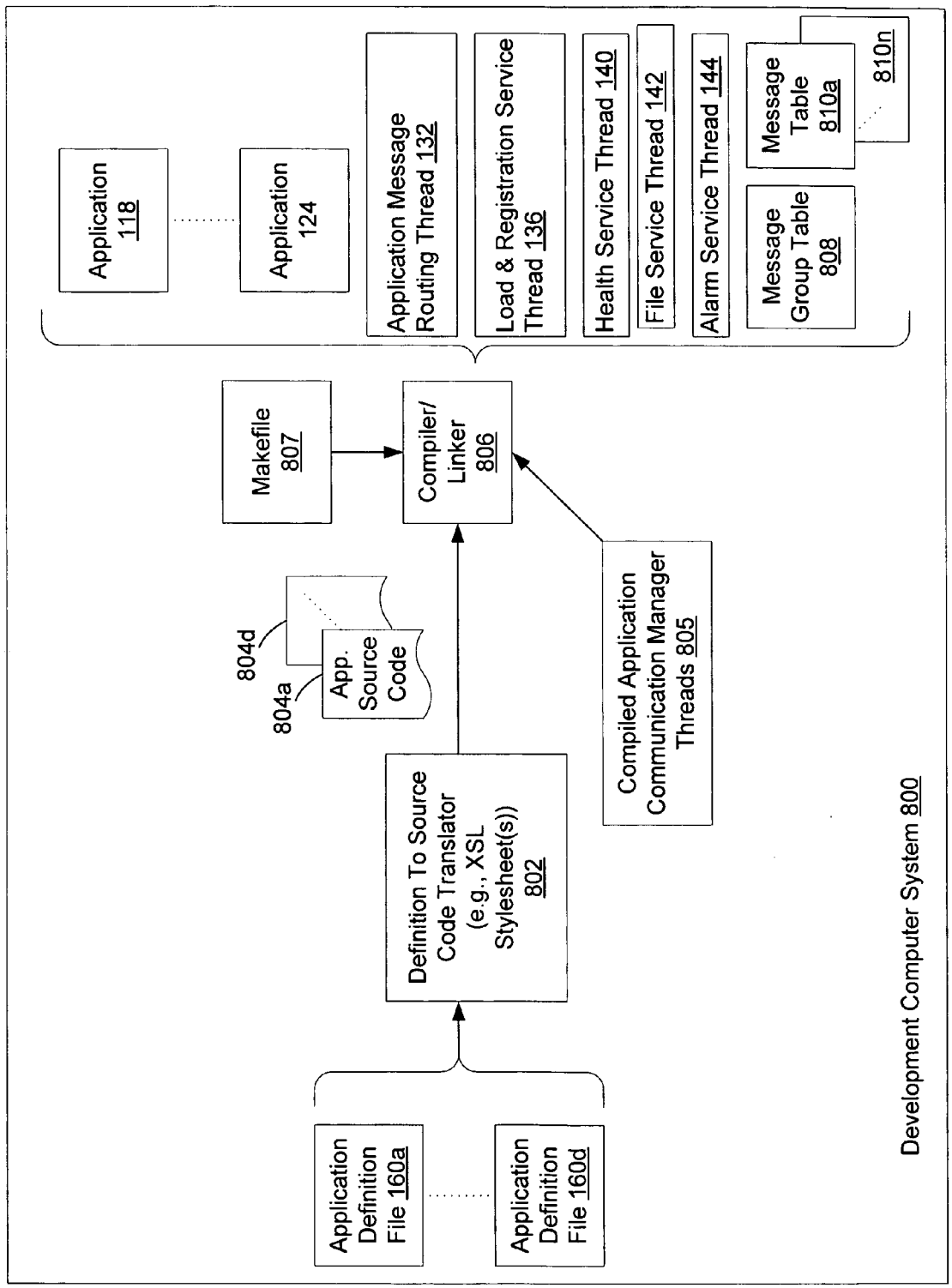
FIG. 8 is a functional block diagram of an exemplary development computer system suitable for generating each application based on the definition file associated with the application in accordance with the present invention.
Figure 9:
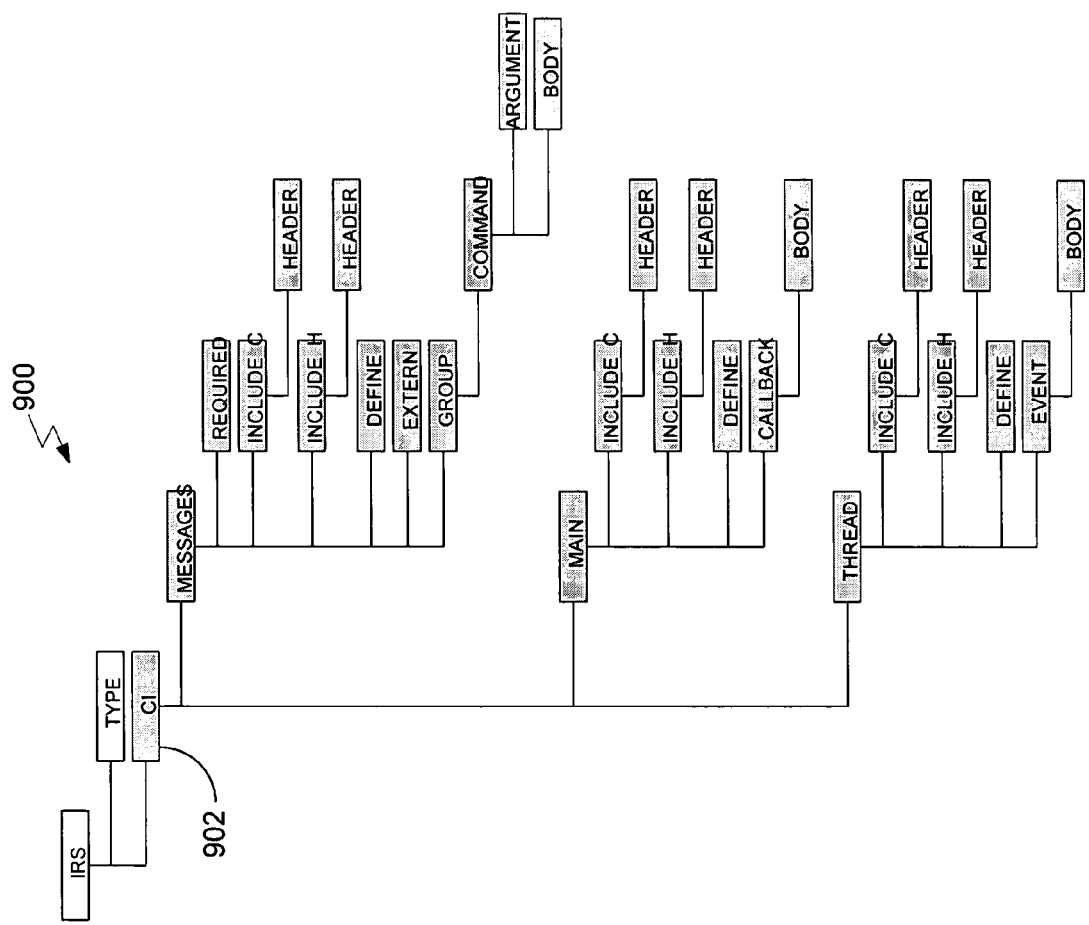
FIG. 9 depicts one embodiment of a makefile structure for compiling and linking the source code for each application in accordance with the present invention.

FIG. 8 is a functional block diagram of an exemplary development computer system 800 suitable for generating each application 118, 120, 122, and 124 based on an associated application definition file 160*a*, 160*b*, 160*c*, or 160*d*. The development computer system 800 may be a standard personal computer (such as Dell or Apple computer) or workstation (such as a Sun Microsystems SPARC workstation). The development computer system 800 includes a definition-to-source code translator 802 operatively configured to parse each application definition file 160*a*, 160*b*, 160*c*, or 160*d* and generate corresponding source code 804*a*-804*d* for each defined application 118, 120, 122, and 124. The source code 804*a*-804*d* may be C++ or other object oriented source code. The definition-to-source code translator 802 may be an XML parser/XSLT (eXtensible Stylesheet Language Translator) processor program (such as "cygwin™" available at www-.cygwin.com) that uses one or more Stylesheets operatively configured to translate application definition files 160*a*, 160*b*, 160*c*, and 160*d* to corresponding source code in accordance with the application API 146 of the applications communication manager 126 and 128. The development computer system 800 also includes a compiler/linker 806 compiling and linking the source code 804*a-d* for the applications 118, 120, 122, and 124 with a library of compiled application communication manager threads 805 in accordance with a makefile 807. FIG. 9 depicts one embodiment of a makefile structure 900 suitable for use by the compiler/linker 806 to generate each application 118, 120, 122, and 124, the application message routing thread 132, health service thread 140, file service thread 142, alarm service thread 144, message group table 808 and message tables 810a-810n for each node 102a and 102n in the data processing system 100. Accordingly, the process depicted in FIG. 8 of generating the applications 118, 120, 122, and 124 in accordance with the application definition files 160a-160d ensures each application 118, 120, 122, and 124 is structured in compliance with the network communication infrastructure provided by the application communication managers 126 and 128 for the data processing system 100.

In an alternative implementation, the message group table 808 and the message tables 810a-810n may be built during compile time by or runtime by the load and registration service thread 136 from each message group definition (e.g., section 702 of application definitions 160a, 160b, 160c, and 160d).

Figure 10:
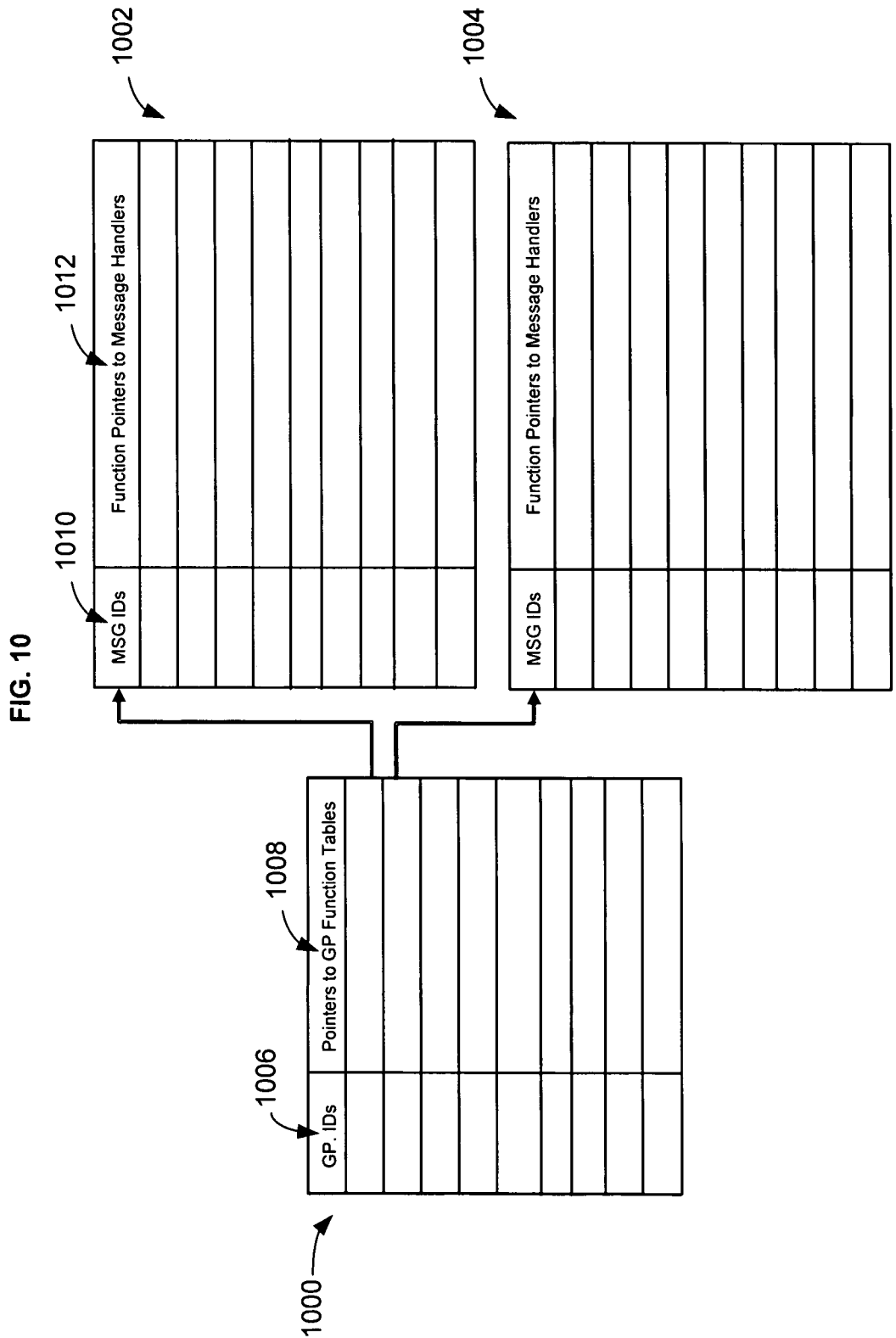
FIG. 10 depicts the structure of a message group table and a plurality of message tables associated with the message group table collectively used by each application for processing a received message.

FIG. 10 depicts the structure of an exemplary message group table 1000 and an exemplary plurality of message tables 1002 and 1004 associated with the message group table 1000 generated from the message group definition 702. The message group table 1000 stores each message group ID 1006 in association with a pointer 1008 to one of the message tables 1002 and 1004 associated with the message group ID 1006. Each message table 1002 and 1004 stores each message ID 1010 in association with a pointer 1012 to one of the message group handlers 150aa-af, 150ba-bg, 150ca-150cg, or 150da-150dn defined for processing a message, such as message 202 in FIG. 2, in accordance with the present invention. In one implementation, when a message 202 is received by the routing thread the command thread 156a, 156b, 156c, or 156d for each application 118, 120, 122, or 124 is operatively configured to identify one (e.g., 150aa) of the message group handlers (e.g., 150aa-af) associated with the respective application (e.g., 118) using the message group ID 214 and message ID 216 stored in the header 204 of the message 202 as indexes into the message group table 1000 and the respective message table 1002 or 1004.

Although the routing thread 132, service threads 136-144, command threads 156a-156d, and H/W control threads 158a-158d and other programs/threads are described as being implemented as software, the present invention may be implemented as a combination of hardware and software. In addition, although aspects of one implementation shown in FIGS. 1A-1B are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, a data processing system suitable for use with methods, systems, and articles of manufacture consistent with the present invention may contain additional or different components.

II. System Initialization Process for Generating Network Communication Infrastructure Turning to FIG. 11, a flow diagram is shown that illustrates steps in a method 1100 for initializing the data processing system 100 to generate an efficient network communication infrastructure consistent with the present invention. In one implementation in which one or more of the nodes 102a and 102n correspond to a user-defined processor device, such as an FPGA, each processing node 102a and 102n may be operatively configured to execute the boot-up program 117 to first call a corresponding node device build code 119a or 119b to configure the internal hardware components of the processing node 102a or 102n in accordance with a circuit design (not shown in the figures) of a user or developer (step 1102). Next, the boot-up program 117 may call an operating system function (such as the "usrAppInit( )" function for the VxWorks operating system) to cause the operating system 130 to execute a startup sequence for the respective node 102a or 102n in accordance with a system initialization file (e.g., 1200 in FIG. 12) for the node 102a or 102n. In one implementation shown in FIG. 12, the system initialization file 1200 identifies one of the applications 118, 120, 122, or 124 for each node to be a master or entry application by specifying an entry point task 1202 for the one application. The identified entry point task 1202, for example, may correspond to a task performed by the main thread 148a of the application 118. The identified entry point task 1202 calls the load and registration service thread 136 residing on the same node 102a and 102n as the application (e.g., 118) having the entry point task 1202 in order to execute the load and registration thread 136 to initialize the system 100 to implement a network communication infrastructure consistent with the present invention (step 1106).

Figure 13:
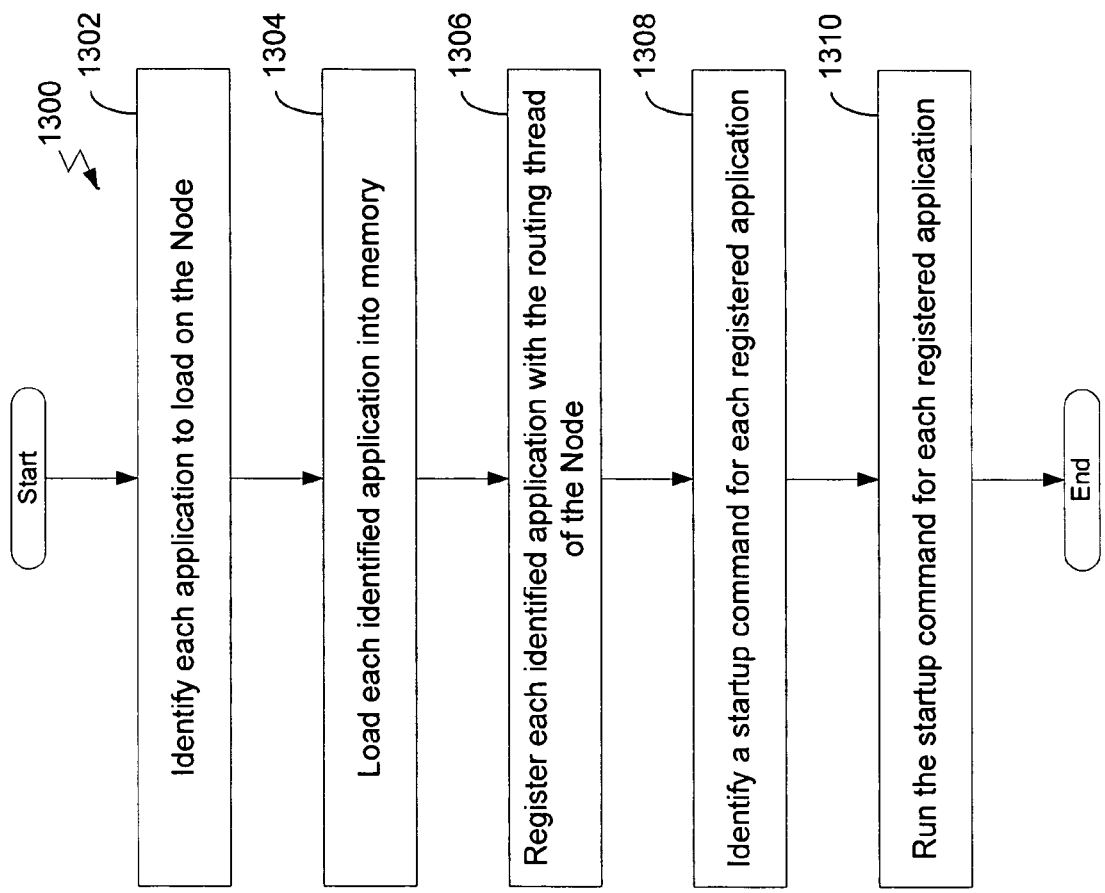
FIG. 13 is a flow diagram illustrating a process performed by a load and registration service thread on at least one of the processing nodes in accordance with the method for initializing the data processing system.

FIG. 13 is a flow diagram illustrating a process 1300 performed by the load and registration service thread 136 on at least one of the nodes 102a or 102n to implement the network communication infrastructure for the data processing system 100. In one implementation, the load and registration service thread 136 implements the network communication infrastructure in accordance with the architecture configuration file 138 associated with the same node 102a or 102n on which the load and registration service thread 136 resides. FIG. 14 depicts an exemplary architecture configuration file 1400 that may be accessed by the load and registration service thread 136. When performing the process 1300, the load and registration service thread 136 initially identifies each application 118, 120 or 122, 124 to load on the node 102a or 102n where the load and registration service thread 136 resides (step 1302). In one implementation, the load and registration service thread 136 identifies each application to load by identifying an application order list 1402 following a load directive 1404 in the architecture configuration file 138. In the example shown in FIG. 14, the application order list 1402 may include an application name 1406, 1408, and 1410 for each application 118,120 or 122, 124 to load on the respective node 102a or 102n (the third name 1410 corresponds to a third application not shown for node 102a or 102n in FIG. 1). Each application name 1406, 1408, and 1410 corresponds to the application identifier tag 602 provided in the application definition file 160a, 160b, 160c, or 160d for each application 118, 120, 122, or 124.

The load and registration service thread 136 then loads each identified application into memory 108 (step 1304). As part of the load step, the load and registration service thread 136 may perform a checksum test in accordance with a size 1412 and checksum value 1414 identified in the architecture configuration file 138 for each application identified in the application order list 1402.

Next, the load and registration service thread 136 registers each identified application with the routing thread 132 of the node 102a or 102n where the routing thread 132 resides (step 1306). In one implementation, the load and registration service thread 136 registers each loaded application by first identifying the application ID 1416 to be assigned or associated with the application names 1406, 1408, 1410. As discussed above, the application ID 1416 for each application 118, 120, 122, or 124 is used to identify the application 118, 120, 122, or 124 as the destination or source application of a message 202 (e.g., application ID 212 in the source location 208 or the destination location 210 of a message 202). In the implementation shown in FIG. 14, each application ID 1416 is assigned to the application names 1406, 1408, 1410 as identified in an application registration list 1418 following a registration directive 1420. In an alternative example, the application ID 1416 for each application 118, 120, 122, and 124 may be identified in a header file (not shown in the figures) associated with the load and registration service thread 136 such that the load and registration service thread 136 is provided with the application ID 1416 for each application 118, 120, 122, and 124 to be registered at compile time or runtime of the applications 118, 120, 122, or 124. As a result of executing the registration step, the load and registration service thread 136 generates a routing table (e.g., routing table 137a or 137b in FIG. 1B) as shown in Table II that lists the application ID 1416 of each registered application 118, 120 or 122,124. The routing table 137a or 137b may also store the application name 1406, 1408, or 1410 in association with the respective application ID 1416.

TABLE II

| Registered Application ID | Registered Application Name |
|---|---|
| 4 | ZZZ |
| 5 | YYY |
| 6 | XXX |

Each routing thread 132 is operatively configured to access the routing thread 137a or 137b residing on the same node 102a or 102n as the respective routing thread 132. In accordance with the present invention, each routing thread 132 accesses the respective routing thread 137a or 137b to determine whether a destination application (e.g., destination location 210 in FIG. 2) identified in a message 202 received on the network 104 resides on the same node 102a or 102n as the routing thread 132.

Returning to FIG. 13, the load and registration service thread 136 next identifies a startup command 1422 for each registered application (step 1308) and triggers each registered application to run its respective startup command 1422 (step 1310). In one implementation, the load and registration service thread 136 also identifies a run order list 1424 and triggers each registered application to run in accordance with the run order list 1424 (step 1310).

Figure 15:
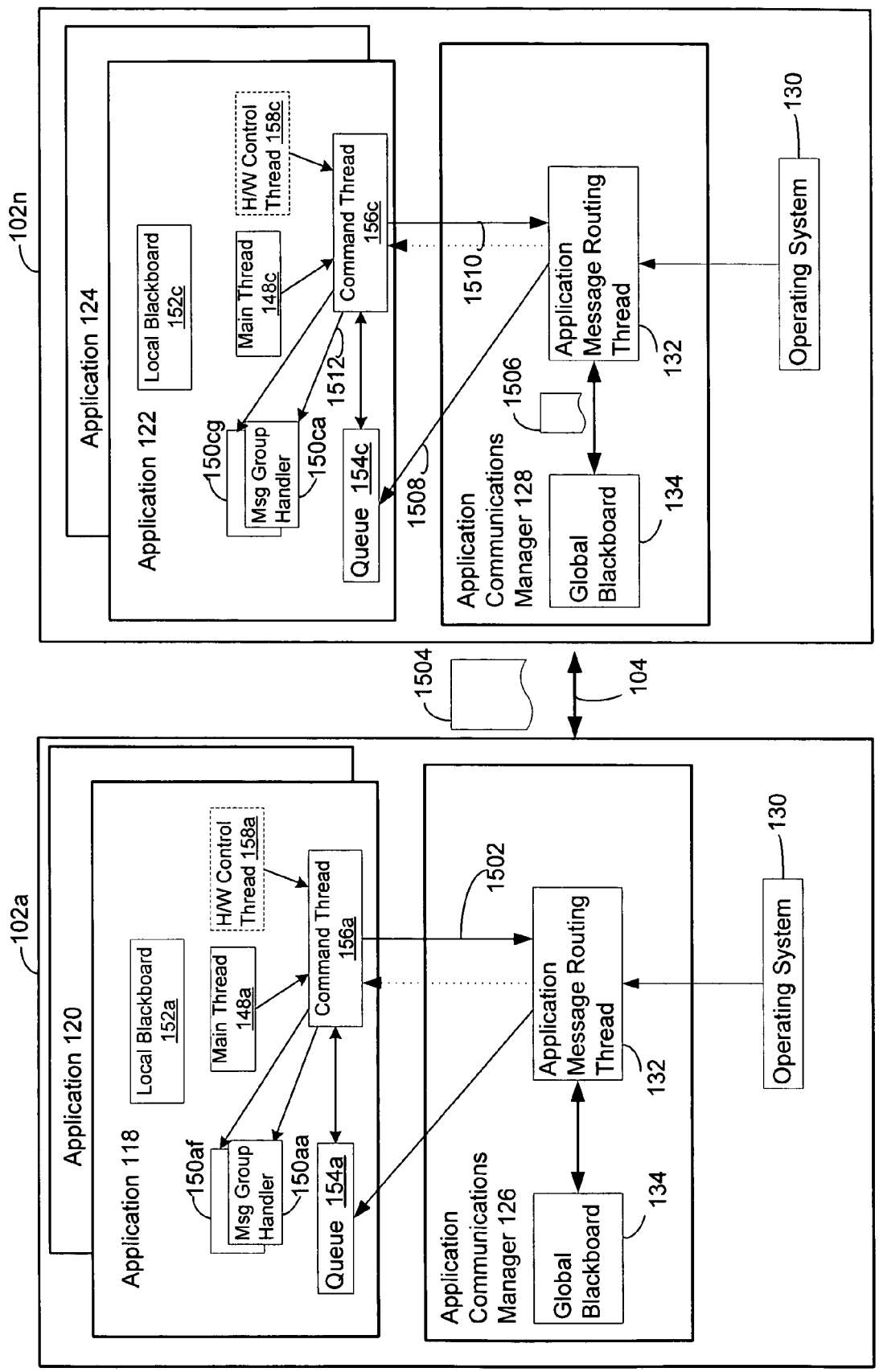
FIG. 15 is an exemplary functional block diagram of the data processing system in FIG. 1 illustrating the efficient network communication infrastructure generated upon initialization of the system.
Figure 16:
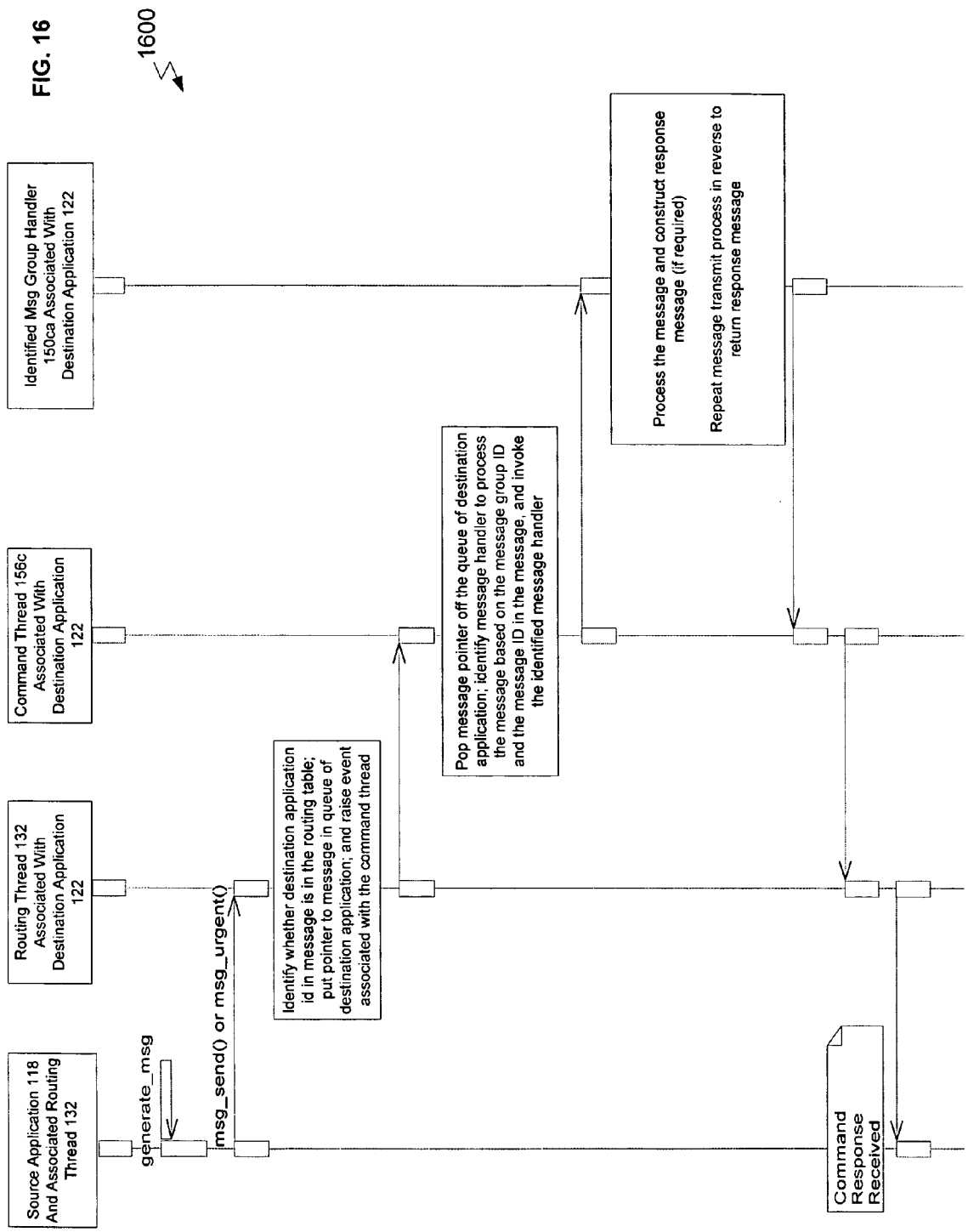
FIG. 16 is an exemplary sequence diagram illustrating a process for communicating a message from a first application to a second application via a first routing thread of the application communications manager residing on the same node as the first application and a second routing thread of the application communication manager residing on the same node as the second application.

III. Application Message Routing in Accordance with the Network Communication Infrastructure FIG. 15 is an exemplary functional block diagram of the data processing system 100 illustrating the efficient network communication infrastructure generated upon initialization of the system by the load and registration service thread 136. For clarity in the discussion, the data processing system 100 is simplified in FIG. 15 to illustrate the network communication infrastructure for communicating a message (e.g., message 1504 in FIG. 15) from a first application 118 to a second application 122 in accordance with the present invention. However, one having skill in the art would appreciate that the same or equivalent infrastructure may be applied to facilitate communication between each of the applications 118, 120, 122, and 124 on the same node 102a or on distributed nodes 102a and 102n. FIG. 16 is an exemplary sequence diagram illustrating a process 1600 for communicating a message (e.g., message 1504 in FIG. 15) from the first application 118 to the second application 122 utilizing the network communication infrastructure depicted in FIG. 15. In one implementation, the network communication infrastructure of the data processing system 100 depicted in FIGS. 1, 15 and 16 includes the network 104, each routing thread 132 on each node 102a and 102n, the command thread 156a, 156b, 156c, and 156d associated with each registered application 118, 120, 122, and 124, and the queue 154a, 154b, 154c, and 154f associated with each command thread 156a, 156b, 156c, and 156d. The network communication infrastructure of the data processing system 100 may further include each of the plurality of message group handlers 150aa-150af, 150ab-150bg, 150ca-150cg, or 150ca-150cn associated with each application 118, 120, 122, and 124 and accessed by the respective command thread 156a, 156b, 156c, and 156d in accordance with the present invention.

As shown in FIGS. 15 and 16, the main thread 156a or the H/W control thread 148a of the first application 118 may send a request 1502 via the command thread 156a to the routing thread 132 on the same node 102a to cause the routing thread 132 to generate a message 1504 from the global blackboard 134 (e.g. "generate_msg" function in FIG. 16) and to send the message 1504 (e.g., "msg_send" function or "msg_urgent" function in FIG. 16) to the second or destination application 122 in accordance with the request 1502. In one implementation in which the command thread 156a and/or the routing thread 132 are in a sleep state awaiting a call or event in accordance with the present invention, the request 1502 may correspond to a function call (e.g. "generate_msg" function in FIG. 16) that causes the command thread 156a and then routing thread 132 to subsequently awaken and process the request 1502.

As previously discussed, each routing thread 132 on each node 102a or 102n is operatively configured to receive a message 202, 302, 304, 306, 308, or 1504 communicated from a application 122 or 124 distributed across the network 104 on another node 102n or 102a. In the implementation shown in FIGS. 15 and 16, the routing thread 132 of the application 122 receives the message 1504, identifies the application ID 212 in the destination location 210 of the message 1504 and determines whether the application ID 212 is present in the routing table 137b for the node 102n. If the application ID 212 is in the routing table 137b, the routing thread 132 is operatively configured to store data 1506 associated with the message 1504 in the global blackboard, place a pointer (e.g., pointer 314) to the message 1504 and associated data 1506 in the message queue 154c of the application 122, and notify the command thread 156c that a message is available or has been received for the application 122 as further described below.

Figure 17:
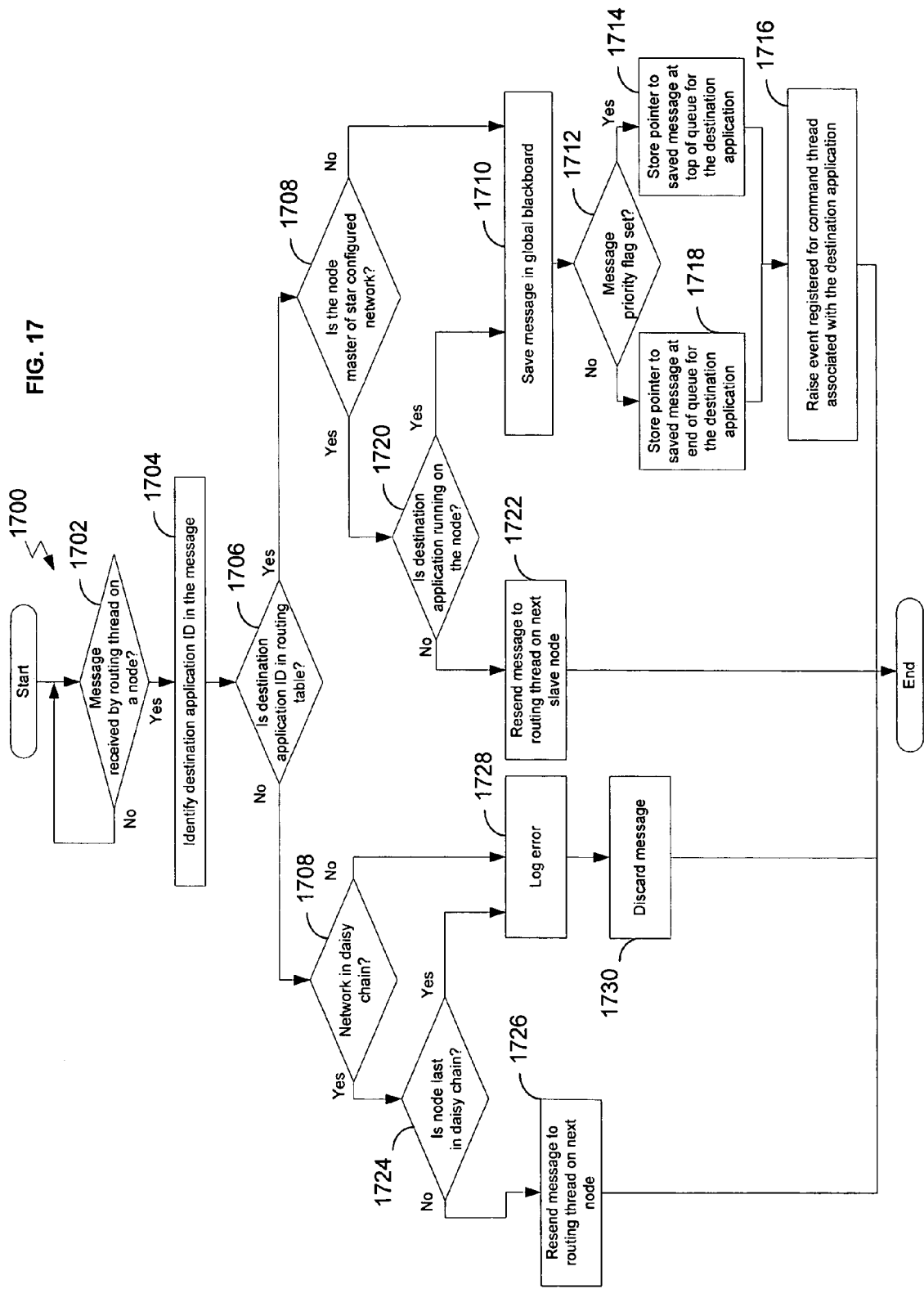
FIG. 17 is a flow diagram illustrating a process performed by each routing thread to determine whether a message is to be directed to an application residing on the same node as the routing thread.

FIG. 17 is a flow diagram illustrating a process 1700 performed by each routing thread 132 to determine whether a message (e.g., message 202 or 1504) is to be directed to an application 118, 120, 122, or 124 residing on the same node 102a or 102n as the routing thread 132. As shown in FIG. 17, the routing thread 132 initially determines whether a message 202 or 1504 has been received or is present on the network at the node 102a or 102n where the routing thread 132 resides (step 1702). If a message 202 or 1504 has not been received, the routing thread 132 may wait or enter a sleep state until a message is received. If a message 202 or 1504 has been received, the routing thread 132 then identifies the destination application ID (e.g., the application ID 212 in the destination location 210) in the received message 202 or 1504 (step 1704).

Next, the routing thread 132 determines whether the destination application ID is in the routing table 137a or 137b associated with the routing thread 132 (step 1706). If the destination application ID is in the routing table 137a or 137b, the routing thread 132 determines whether the node 102a or 102n on which the routing thread 132 resides is a master node in a star configured network (step 1708). If the node 102a or 102n on which the routing thread 132 resides is not a master node in a star configured network, the routing thread 132 saves the message 202 or 1504 in the global backboard 134 associated with the routing thread (step 1710). The routing thread 132 then determines whether the received message 202 or 1504 has a priority flag 218 set (step 1712). If the received message 202 or 1504 has a priority flag 218 set, the routing thread 132 stores a pointer to the saved message (e.g., pointer 314 to the saved message 302) at the top of the message queue 154a, 154b, 154c, or 154d of the application 118, 120, 122, or 124 (step 1714). The routing thread then raises the event (e.g., event name 619 "EVENT_CI_MSG_AVAILABLE") registered for the command thread 156 associated with the destination application identified in the received message 202 or 1504 (step 1716) before ending processing.

If the received message 202 or 1504 does not have a priority flag 218 set, the routing thread 132 stores a pointer to the saved message (e.g., pointer 314 to the saved message 302) at the end or bottom of the message queue 154a, 154b, 154c, or 154d of the application 118, 120, 122, or 124 (step 1718) before continuing processing at step 1716 to raise the event 619 registered for the command thread 156.

If the node 102a or 102n on which the routing thread 132 resides is a master node in a star configured network, the routing thread 132 then determines whether the destination application identified in the message 202 or 1504 is running on the node (step 1720). If the destination application identified in the message 202 or 1504 is running on the node, the routing thread 132 continues processing at step 1710. If the destination application identified in the message 202 or 1504 is not running on the node, the routing thread 132 resends the received message 202 or 1504 to the routing thread 132 on a next slave node (e.g., node 102a) (step 1722) before ending processing.

If the destination application ID is not in the routing table 137a or 137b, the routing thread 132 determines whether the node 102a or 102n on which the routing thread 132 resides is in a daisy-chained network of nodes 102a or 102n (step 1724). If the node 102a or 102n on which the routing thread 132 is in a daisy-chained network, the routing thread 132 determines whether the node on which the routing thread 132 resides is the last node in the daisy-chain (step 1726). In one implementation, the architecture configuration file 138 may include a daisy-chain identifier (not shown in figures) to indicate that the node 102a or 102n on which the architecture configuration file 138 resides is the last node in the daisy-chain. If the node 102a or 102n on which the routing thread 132 resides is not the last node in the daisy-chain, the routing thread 132 resends the message 202 or 1504 to the next node (e.g., node 102a) in the daisy-chain network (step 1728) before ending processing. If the node 102a or 102n on which the routing thread 132 resides is not in a daisy-chained network or is the last node in a daisy-chained network, the routing thread 132 then logs an error to reflect that the message 202 or 1504 has an incorrect destination application location 210 (step 1730) and discards the received message 202 or 1504 (step 1732) before ending processing.

FIG. 18 is a flow diagram illustrating a process 1800 performed by the command thread 156a, 156b, 156c, or 156d associated with each application 118, 120, 122, or 124 in response to receiving a message available event indication (e.g., event name 619 "EVENT_CI_MSG_AVAILABLE") registered for the command thread 156. As discussed above, the routing thread 132 raises the message available event 619 associated with the application 118, 120, 122, or 124 after storing a pointer to a received message 202 or 1504 stored in the global blackboard 134. As shown in FIG. 18, the command thread 156a, 156b, 156c, or 156d initially determines whether a message available event 619 has been received (step 1802). If a message available event 619 has not been received, the command thread 156a, 156b, 156c, or 156d may wait for a message 202 or 1504 by remaining in a sleep state until the message available event 619 is received so that CPU 106 processing associated with the respective command thread 156a, 156b, 156c, or 156d is substantially eliminated.

If a message available event 619 has been received, the command thread 156a, 156b, 156c, or 156d identifies the message group ID 214 and the message ID 216 associated with the first or top message pointer in the message queue 154a, 154b, 154c, or 154d associated with the command thread 156a, 156b, 156c, or 156d (step 1804). The command thread 156a, 156b, 156c, or 156d then calls the message group handler (e.g., 150aa, 150ba, 150ca, or 150da) associated with the identified message group ID 214 and the message ID 216 to process the message 202 or 1504 saved in the global blackboard 134 residing on the same node 102a or 102n as the command thread 156a, 156b, 156c, or 156d (step 1806). In one implementation, the command thread 156a, 156b, 156c, or 156d uses the message group ID 214 as an index into the message group table 1000 to identify a pointer to a respective message table 1002 or 1004. The command thread 156a, 156b, 156c, or 156d then uses the message ID 216 as an index into the respective message table 1002 or 1004 to identify a pointer to a corresponding one of the message group handlers associated with the message group ID 214 and the message ID 216 of the message 202 or 1504 to be processed. The command thread 156a, 156b, 156c, or 156d then may determine whether the received message 202 or 1504 is from a command message group (step 1808). If the received message 202 or 1504 is from a command message group, the command thread 156 may then call a function for generating a response message (step 1810). If the received message 202 or 1504 is not from a command message group or after calling the function for generating a response message, the command thread 156a, 156b, 156c, or 156d ends processing.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The foregoing description of implementations of the invention has been presented for purposes of illustration and description. It is not exhaustive and does not limit the invention to the precise form disclosed. Modifications and variations are possible in light of the above teachings or may be acquired from practicing of the invention. Additionally, the described implementation includes software, such as the routing thread 132 and the command thread 156a, 156b, 156c, or 156c associated with each application 118, 120, 122, or 124, but the present invention may be implemented as a combination of hardware and software. For example, the routing thread 132 and the command thread 156a, 156b, 156c, or 156c may be implemented in the node FPGA build code 119a or 119b for the respective node 102a or 102b. Note also that the implementation may vary between systems. The invention may be implemented with both object-oriented and non-object-oriented programming systems. The claims and their equivalents define the scope of the invention.

What is claimed is:

1. A data processing system having a plurality of data processing nodes distributed across a network, each data processing node comprising:
    memory storing a task application having a command thread, the memory further storing a routing thread configured to receive and send messages over the network, each message having a destination application identifier, the routing thread using the destination application identifier to enable the stored task application to communicate directly with a task application of another node across the network without using network addresses, the routing thread forwarding a received message to the command thread if the destination application identifier in the received message identifies the stored task application; and
    a processor to run the application and the routing thread.

2. The system according to claim 1, wherein the task application also has a message queue associated with the command thread; and wherein if the destination application identifier in the received message identifies the stored task application, the routing thread is configured to store the received message and a pointer to the stored message in the message queue.

3. The system according to claim 1, wherein the command thread is in a sleep state until the routing thread notifies the command thread to process the received message.

4. The system according to claim 3, wherein the message further includes a message identifier and, in response to the notification from the routing thread, the command thread directs the received message to one of a plurality of message group handlers based on a message group identifier and the message identifier, the message group identifier indentifying the received message as being associated with one of a plurality of functional group types.

5. The system according to claim 1, wherein each data processing node further comprises secondary storage that stores an architecture configuration file, wherein the memory of each data processing node further stores a load and registration thread that is configured to identify the task application and load the task application from the secondary storage and initiate execution of the task application in accordance with the architecture configuration file, and register the task application with the routing thread.

6. The system according to claim 5, wherein the load and registration thread is further configured to generate a routing table that identifies each task application loaded in the memory of the data processing node where the load and registration thread resides.

7. The system according to claim 6, wherein the routing thread uses the routing table to determine whether the destination application identifier of the received message identifies the stored task application.

8. The system according to claim 1, wherein a first one of the nodes is part of a sensor subsystem, wherein the command thread of the first node is in a sleep state until the destination application identifier in the received message identifies the task application stored in the first node; and wherein the command thread wakes and causes the task application to perform a sensing operation.

9. The system according to claim 8, wherein the message received by the first node is sent by a second one of the nodes that is part of a central computer system, and wherein results of the sending operation are sent in a message including a destination application identifier corresponding to a task application residing in the second node.

10. The system according to claim 1, wherein the memory of each node further stores a global blackboard that is operatively controlled by the routing thread; and wherein the routing thread stores in the global blackboard each message transmitted or received by each task application residing on the same node as the routing thread.

11. The system according to claim 10, wherein the stored task application includes a local blackboard for storing a state condition for message data associated with the stored task application, and wherein the routing thread limits application message data storage to the global blackboard.

12. An article comprising a non-transitory computer-readable medium encoded with instructions for controlling a first node of a data processing system, including:
    accessing a list of task applications to load into memory of the first node;
    loading each of the applications identified in the list into the memory of the first node, each of the task applications identified in the list having a command thread;
    storing a task application identifier for each of the loaded task applications in a routing table;
    receiving a message having a destination application identifier and a message group identifier; and
    if the destination application identifier corresponds to one of the task application identifiers in the routing table, sending the received message to the command thread of the corresponding task application.

13. The article of claim 12, wherein the command thread of the application corresponding to the destination application identifier is operatively configured to direct, in response to the notification, the received message to one of a plurality of message group handlers based on the message group identifier of the received message.

14. The article of claim 12, wherein each of the applications in the list has a message queue associated with the command thread of the respective application and, when it is determined that the destination application identifier corresponds to one of the task application identifiers in the routing table, the received message and a pointer to the received message are stored in the message queue corresponding to the destination application identifier.

15. The article of claim 12, wherein the command thread of the application corresponding to the destination application identifier is notified about the received message by raising one of a plurality of operating system events.

16. The article of claim 12, wherein the message further includes a message identifier; and wherein the command thread of the application corresponding to the destination application identifier directs the received message to one of the plurality of message group handlers based on the message group identifier and the message identifier.

17. A method for routing messages between a plurality of data processing nodes distributed across a network, the method for each node comprising using a processor to run a routing thread to receive and send messages over the network, each message having source and destination application identifiers, the routing thread using the application identifiers to enable a first task application residing on the first node to communicate directly with a second task application of another node across the network without using network addresses, the routing thread forwarding a received message to a command thread of the first task application if the destination application identifier in the received message identifies the first task application.

* * * * *